United States Patent
Luo et al.

(10) Patent No.: US 10,420,082 B2
(45) Date of Patent: Sep. 17, 2019

(54) FEEDBACK OF CONTROL INFORMATION FOR MULTIPLE CARRIERS

(71) Applicant: QUALCOMM Incorporated, San Diego, CA (US)

(72) Inventors: Xiliang Luo, San Diego, CA (US); Wanshi Chen, San Diego, CA (US); Tao Luo, San Diego, CA (US); Peter Gaal, San Diego, CA (US); Xiaoxia Zhang, San Diego, CA (US); Hao Xu, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 14/743,211

(22) Filed: Jun. 18, 2015

(65) Prior Publication Data
US 2015/0289257 A1 Oct. 8, 2015

Related U.S. Application Data

(63) Continuation of application No. 13/078,488, filed on Apr. 1, 2011, now Pat. No. 9,083,501.
(Continued)

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/0026* (2013.01); *H04L 1/0028* (2013.01);
(Continued)

(58) Field of Classification Search
None
See application file for complete search history.

(56) References Cited

U.S. PATENT DOCUMENTS 7,035,243 B2 4/2006 Shpak
8,331,215 B2 12/2012 Shen et al.
(Continued)

FOREIGN PATENT DOCUMENTS

CA 2737882 A1 3/2010
CN 201004702 Y 1/2008
(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 9), 3GPP TS 36.212 V9.1.0 (Mar. 2010).
(Continued)

*Primary Examiner* — Abdelnabi O Musa
(74) *Attorney, Agent, or Firm* — Patterson & Sheridan, LLP

(57) ABSTRACT

Techniques for sending control information relating to multiple downlink carriers and data on a single uplink carrier are described. A user equipment (UE) may be scheduled to transmit on a designated uplink carrier. The UE can multiplex control information for multiple downlink carriers with data for transmission on the uplink carrier in a same subframe. Multiplexing may be performed according to a type of the control information and/or an ordering, priority, or association of the downlink carriers. The UE can selectively encode the control information separately for each downlink carrier and/or jointly across downlink carriers. The control information may be mapped to a single layer or multiple layers of a data channel. The UE may send the multiplexed
(Continued)

control information and data on the data channel in the subframe while maintaining a single-carrier waveform.

30 Claims, 15 Drawing Sheets

Related U.S. Application Data

(60) Provisional application No. 61/321,038, filed on Apr. 5, 2010.

(51) Int. Cl.
    *H04L 5/00* (2006.01)
    *H04L 1/00* (2006.01)
    *H04L 27/26* (2006.01)

(52) U.S. Cl.
    CPC ............ *H04L 5/001* (2013.01); *H04L 5/0055* (2013.01); *H04L 5/0057* (2013.01); *H04L 5/0064* (2013.01); *H04L 5/0023* (2013.01); *H04L 5/0044* (2013.01); *H04L 27/2618* (2013.01)

(56) References Cited

U.S. PATENT DOCUMENTS

| | | | |
|---|---|---|---|
| 8,588,259 | B2 | 11/2013 | Papasakellariou et al. |
| 8,917,796 | B1* | 12/2014 | Mayrench ............... H04L 5/006 375/260 |
| 2008/0037675 | A1* | 2/2008 | Lin ...................... H04B 7/0417 375/262 |
| 2008/0232489 | A1* | 9/2008 | Tsai ...................... H04L 1/0071 375/260 |
| 2008/0316959 | A1 | 12/2008 | Bachl et al. |
| 2009/0010213 | A1* | 1/2009 | Yamada et al. ............... 370/329 |
| 2009/0073922 | A1 | 3/2009 | Malladi et al. |
| 2009/0122857 | A1 | 5/2009 | Li et al. |
| 2009/0196247 | A1 | 8/2009 | Fan et al. |
| 2009/0207784 | A1 | 8/2009 | Lee et al. |
| 2009/0262856 | A1* | 10/2009 | Onggosanusi et al. ....... 375/267 |
| 2009/0282310 | A1* | 11/2009 | Seok ................. H04B 7/0417 714/748 |
| 2009/0316631 | A1* | 12/2009 | Kato et al. .................... 370/328 |
| 2009/0323613 | A1 | 12/2009 | Frederiksen et al. |
| 2010/0195594 | A1* | 8/2010 | Seo et al. ....................... 370/329 |
| 2010/0220800 | A1* | 9/2010 | Erell ..................... H04L 5/0023 375/267 |
| 2010/0309876 | A1 | 12/2010 | Khandekar et al. |
| 2011/0243012 | A1 | 10/2011 | Luo et al. |
| 2011/0249578 | A1* | 10/2011 | Nayeb Nazar et al. ...... 370/252 |
| 2011/0255469 | A1 | 10/2011 | Kishiyama et al. |
| 2011/0310823 | A1* | 12/2011 | Nam .................... H04L 1/0073 370/329 |
| 2011/0310856 | A1* | 12/2011 | Hariharan ............. H04L 1/1607 370/336 |
| 2011/0317652 | A1 | 12/2011 | Kim et al. |
| 2012/0140743 | A1* | 6/2012 | Pelletier et al. ............... 370/335 |

FOREIGN PATENT DOCUMENTS

| | | |
|---|---|---|
| EP | 2330845 A1 | 6/2011 |
| WO | WO-2009020983 A1 | 2/2009 |
| WO | WO-2009061122 A2 | 5/2009 |
| WO | WO-2009061664 A2 | 5/2009 |
| WO | WO-2009099389 A1 | 8/2009 |
| WO | WO-2009107985 A1 | 9/2009 |
| WO | WO-2010025249 A1 | 3/2010 |
| WO | WO-2010032811 A1 | 3/2010 |

OTHER PUBLICATIONS

Baker M., "LTE-Advanced Physical Layer", IMT-Advanced Evaluation Workshop Dec. 17-18, 2009, Beijing, 9 No. REV-090003r1 Dec. 17, 2009 (Dec. 17, 2009), pp. 1-48, XP002637658, Retrieved from the Internet: URL:http://www.3gpp.org/ftp/workshop/2009-12-17_ITU-R_IMT-Adv_eval/docs/pdf/REV-090003-r1.pdf [retrieved on May 18, 2011] p. 17-p. 19.
European Search Report—EP14173048—Search Authority—The Hauge—dated Sep. 4, 2014.
International Search Report and Written Opinion—PCT/US2011/031307, ISA/EPO—dated Sep. 7, 2011.
Qualcomm Europe; "Considerations on Multiplexing of Control and User Data for xFDMA based E-UTRA Uplink Evaluation," 3GPP TSG-RAN WG1 #42bis, Document #R1-051102, San Diego, CA, USA, pp. 1-6, XP002446638, Oct. 10, 2005.
Taiwan Search Report—TW100111866—TIPO—dated Jan. 16, 2014.

* cited by examiner

FEEDBACK OF CONTROL INFORMATION FOR MULTIPLE CARRIERS

The present application is a continuation of U.S. application Ser. No. 13/078,488, entitled "FEEDBACK OF CONTROL INFORMATION FOR MULTIPLE CARRIERS," filed Apr. 1, 2011, which claims priority to provisional U.S. Application Ser. No. 61/321,038, entitled "MULTI-CARRIER CONTROL FEEDBACK," filed Apr. 5, 2010; both of which are assigned to the assignee hereof and incorporated herein by reference.

BACKGROUND

I. Field

The present disclosure relates generally to communication, and more specifically to techniques for sending control information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. Such characteristics, for example, may be conveyed in system information that describes operation on the carrier. A carrier may also be referred to as a component carrier (CC), a frequency channel, a cell, etc. A base station may send data transmissions on multiple carriers for the downlink (or downlink carriers) to a UE. The UE may send control information on a carrier for the uplink (or uplink carrier) to support data transmissions on the multiple downlink carriers.

SUMMARY

Techniques for sending control information relating to multiple downlink carriers on a single uplink carrier are described herein. A user equipment (UE) can selectively multiplex control information for a plurality of downlink carriers and data for transmission in a same subframe. The control information may include different types of control information and the multiplexing may be performed based on the type of control information and/or an ordering, priority, or association of the downlink carriers. The UE may send the multiplexed control information and data on a data channel on the uplink carrier in the subframe. This may enable the UE to maintain a single-carrier waveform for the data channel, which can result in a lower peak-to-average power ratio (PAPR).

In one design, a UE may determine that it is configured for multi-carrier operation on a set of downlink carriers. The UE may determine a subframe in which to send data on an uplink carrier. The UE may also determine multiple downlink carriers for which to send control information in the subframe. The UE may determine control information for the multiple downlink carriers to send in the subframe, e.g., based on a periodic feedback reporting configuration for the downlink carriers and/or a feedback request for the downlink carriers. The control information for each downlink carrier may comprise channel quality indicator (CQI), precoding matrix indicator (PMI), rank indicator (RI), acknowledgement/negative acknowledgement (ACK/NACK), some other information, or a combination thereof. The UE can multiplex the control information for the multiple downlink carriers with the data to send on the uplink carrier. The UE may then send the multiplexed control information and data on a data channel on the uplink carrier in the subframe.

In one design, the UE may separately encode control information for each downlink carrier. In another design, the UE may jointly encode control information across the multiple downlink carriers for each type of control information. In yet another design, the UE may jointly encode control information of one type and separately encode control information of another type.

In one design, the UE may map the control information for the multiple downlink carriers to a single layer of the data channel. In another design, the UE may map the control information for the multiple downlink carriers to multiple layers of the data channel. The UE may also encode, multiplex, and/or map the control information for the multiple downlink carriers in other manners.

Various aspects and features of the disclosure are described in further detail below.

BRIEF DESCRIPTION OF THE DRAWINGS

FIGS. 7A and 7B show two exemplary mappings of control information for multiple downlink carriers and data to one layer of a data channel.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
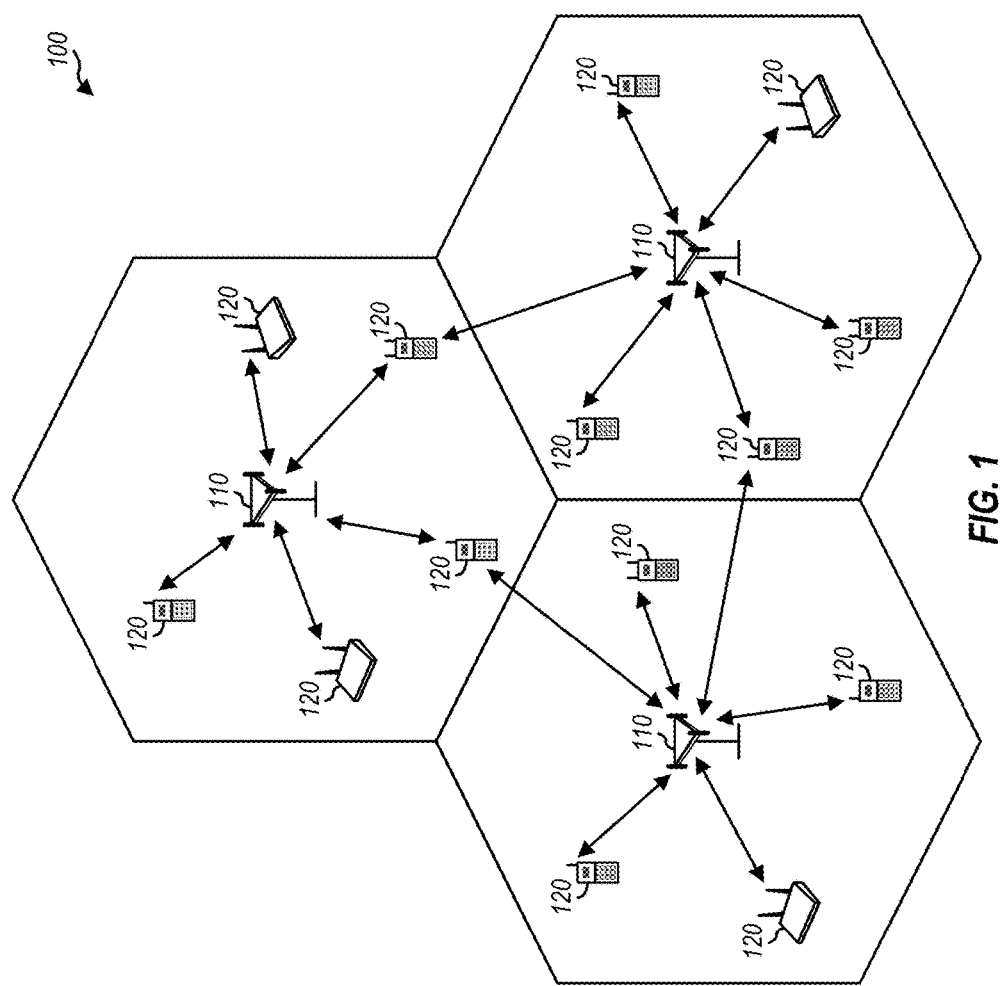
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells. The term "cell" may also refer to a carrier on which an eNB operates.

UEs may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

Wireless network 100 may support multi-carrier operation with multiple carriers on the downlink and one or more carriers on the uplink. A carrier used for the downlink may be referred to as a downlink (DL) carrier, and a carrier used for the uplink may be referred to as an uplink (UL) carrier. An eNB may transmit data and control information on one or more downlink carriers to a UE. The UE may transmit data and control information on one or more uplink carriers to the eNB.

Figure 2:
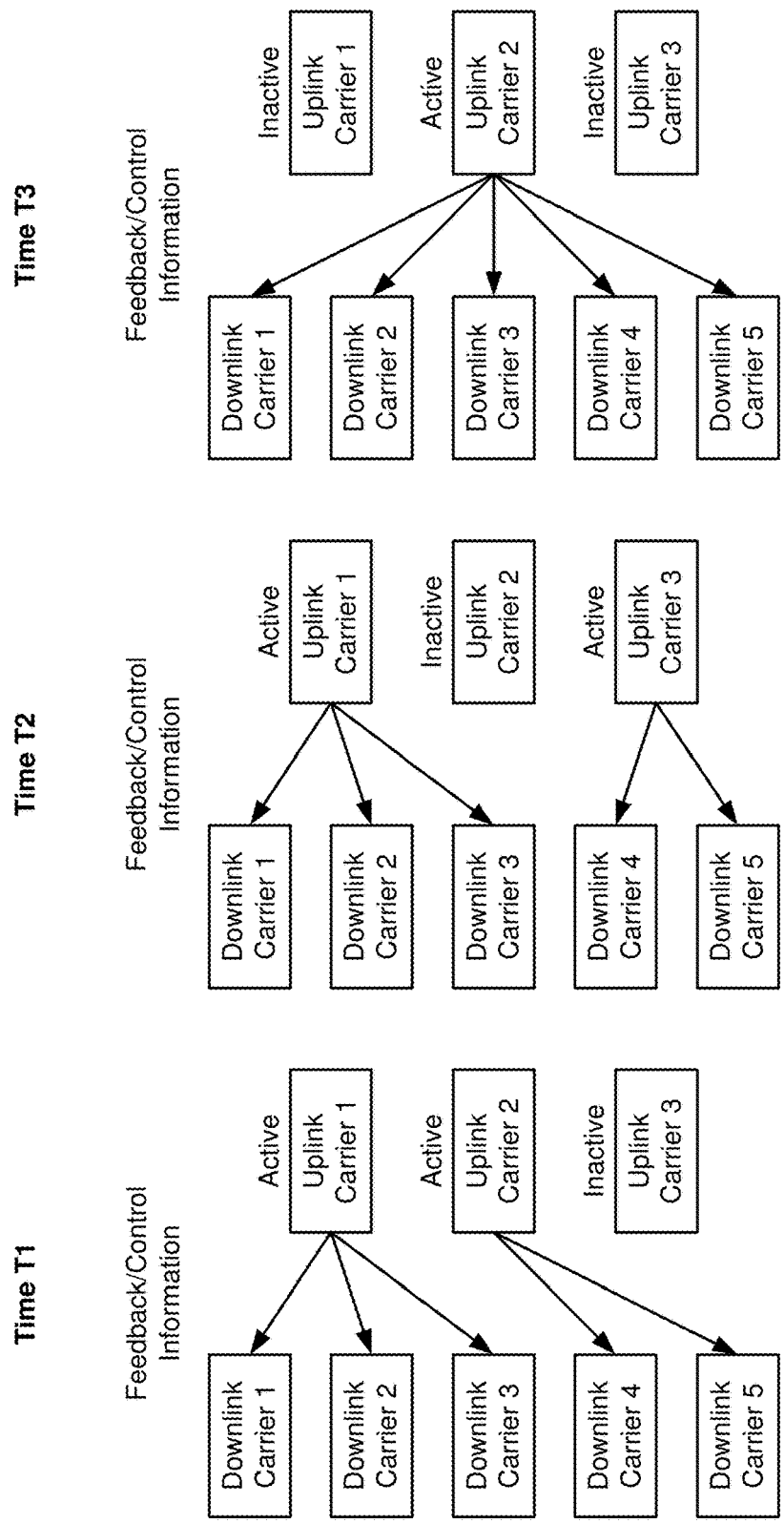
FIG. 2 shows an example of multi-carrier operation for a UE.

FIG. 2 shows an example of multi-carrier operation for a UE. In this example, the UE may be configured with five downlink carriers 1 to 5 and three uplink carriers 1 to 3. In one design, each downlink carrier may be associated with a designated uplink carrier such that the UE sends control information associated with the downlink carrier to an eNB on the designated uplink carrier. Multiple downlink carriers may be associated with a single uplink carrier. In one example, the eNB may signal the associations or linkages to the UE in system information blocks (SIBs). Alternatively, or additionally, the eNB may convey the associations to the UE in one or more higher-layer messages. The associations may be static or may change over time.

In the example shown in FIG. 2, at time T1, uplink carriers 1 and 2 are active, and uplink carrier 3 is inactive. Uplink carrier 1 is associated with and carries control information for downlink carriers 1, 2 and 3. Uplink carrier 2 is associated with and carries control information for downlink carriers 4 and 5. At time T2, uplink carriers 1 and 3 are active, and uplink carrier 2 is inactive. Uplink carrier 1 is associated with and carries control information for downlink carriers 1, 2 and 3. Uplink carrier 3 is associated with and carries control information for downlink carriers 4 and 5. At time T3, only uplink carrier 2 is active, and uplink carriers 1 and 3 are inactive. Uplink carrier 2 is associated with and carries control information for all five downlink carriers 1 to 5. In general, a UE may be configured with any number of downlink carriers and any number of uplink carriers. The downlink carriers may be mapped to the uplink carriers in various manners. The mapping between downlink carriers and uplink carriers may be semi-static of dynamic.

LTE utilizes orthogonal frequency division multiplexing (OFDM) on the downlink and single-carrier frequency division multiplexing (SC-FDM) on the uplink. OFDM and SC-FDM partition a frequency range for a carrier into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the carrier bandwidth. For example, $N_{FFT}$ may be equal to 128, 256, 512, 1024 or 2048 for a carrier bandwidth of 1.25, 2.5, 5, 10 or 20 MHz, respectively.

The transmission timeline for each of the downlink and uplink may be partitioned into units of subframes. Each subframe may have a predetermined duration, e.g., one millisecond (ms), and may be partitioned into two slots. Each slot may include six symbol periods for an extended cyclic prefix or seven symbol periods for a normal cyclic prefix.

The available time-frequency resources for each carrier may be partitioned into resource blocks. The number of resource blocks for each carrier in each slot may be dependent on the carrier bandwidth and may range from 6 to 110. Each resource block may cover 12 subcarriers in one slot and may include a number of resource elements. Each resource element may cover one subcarrier in one symbol period and may be used to send one modulation symbol, which may be a real or complex value.

Figure 3:
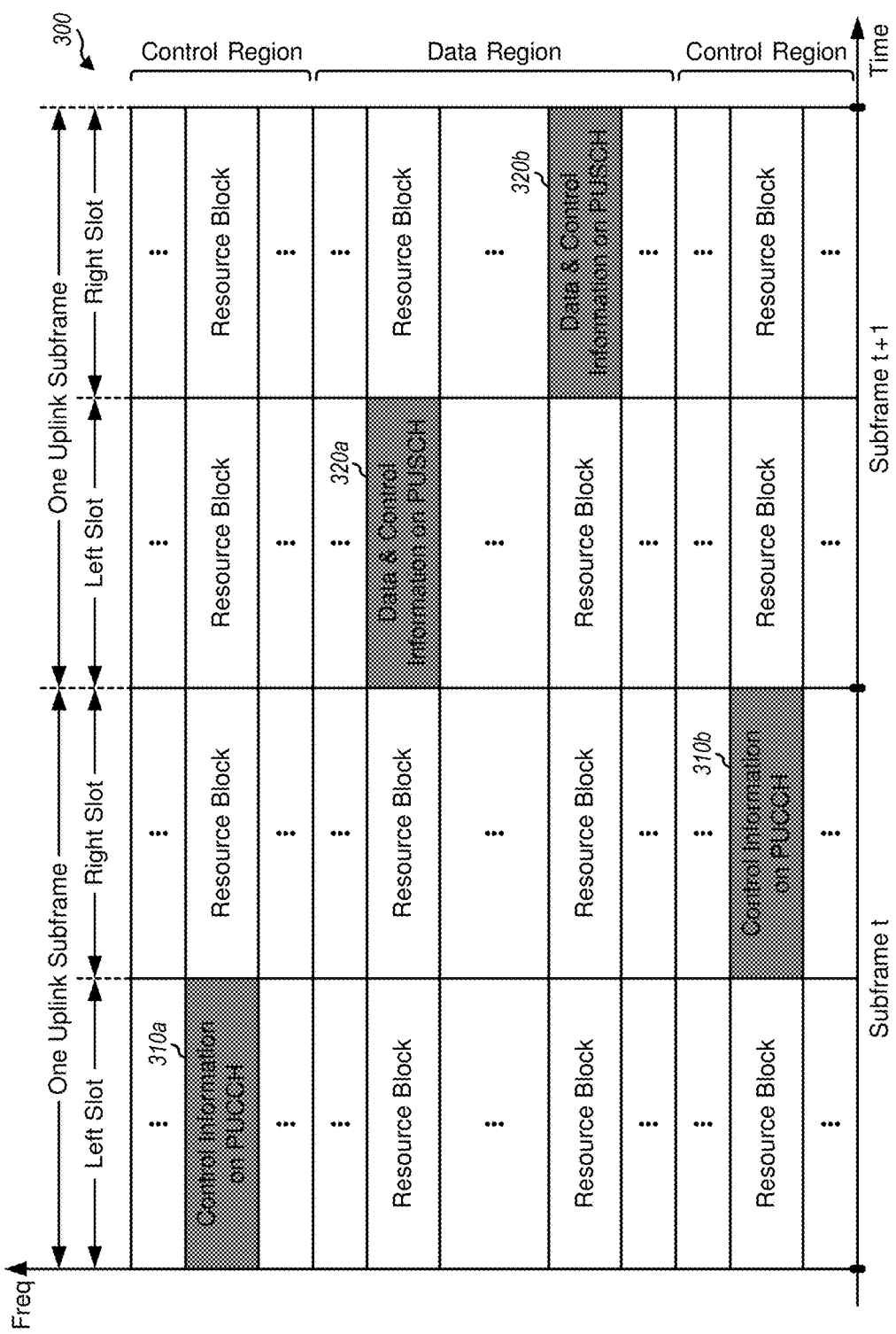
FIG. 3 shows an exemplary transmission structure for one uplink carrier.

FIG. 3 shows an exemplary transmission structure with two subframes for an uplink carrier in LTE. On the uplink, the available resource blocks may be partitioned into a data section and a control section. The control section may be formed at the two edges of the carrier bandwidth (as shown in FIG. 3) and may have a configurable size. The data section may include all resource blocks not included in the control section. A UE may be assigned two resource blocks 310a and 310b (or possibly more than two resource blocks) in the control region in two slots of one subframe to send control information on a Physical Uplink Control Channel (PUCCH). The two resource blocks may occupy different sets of subcarriers when frequency hopping is enabled, as shown in FIG. 3. The UE may be assigned two resource blocks 320a and 320b (or possibly more than two resource blocks) in the data region in two slots of one subframe to send only data or both data and control information on a Physical Uplink Shared Channel (PUSCH).

Wireless network 100 may support transmission of data with hybrid automatic retransmission (HARQ) in order to improve reliability. For HARQ, a transmitter may send an initial transmission of a packet of data and may send one or more additional transmissions of the packet, if needed, until the packet is decoded correctly by a receiver, or the maximum number of transmissions of the packet has occurred, or some other termination condition is encountered. After each transmission of the packet, the receiver may decode all received transmissions of the packet to attempt to recover the packet and may send an ACK if the packet is decoded correctly or a NACK if the packet is decoded in error. The transmitter may send another transmission of the packet if a NACK is received and may terminate transmission of the packet if an ACK is received. The transmitter may process (e.g., encode and modulate) the packet based on a modulation and coding scheme (MCS), which may be selected such that the packet can be decoded correctly with high probability after a target number of transmissions of the packet. This target number of transmissions may be referred to as a target termination. A packet may also be referred to as a transport block, a codeword, a data block, etc. A transmission of one or more packets may be referred to as a data transmission.

Figure 4:
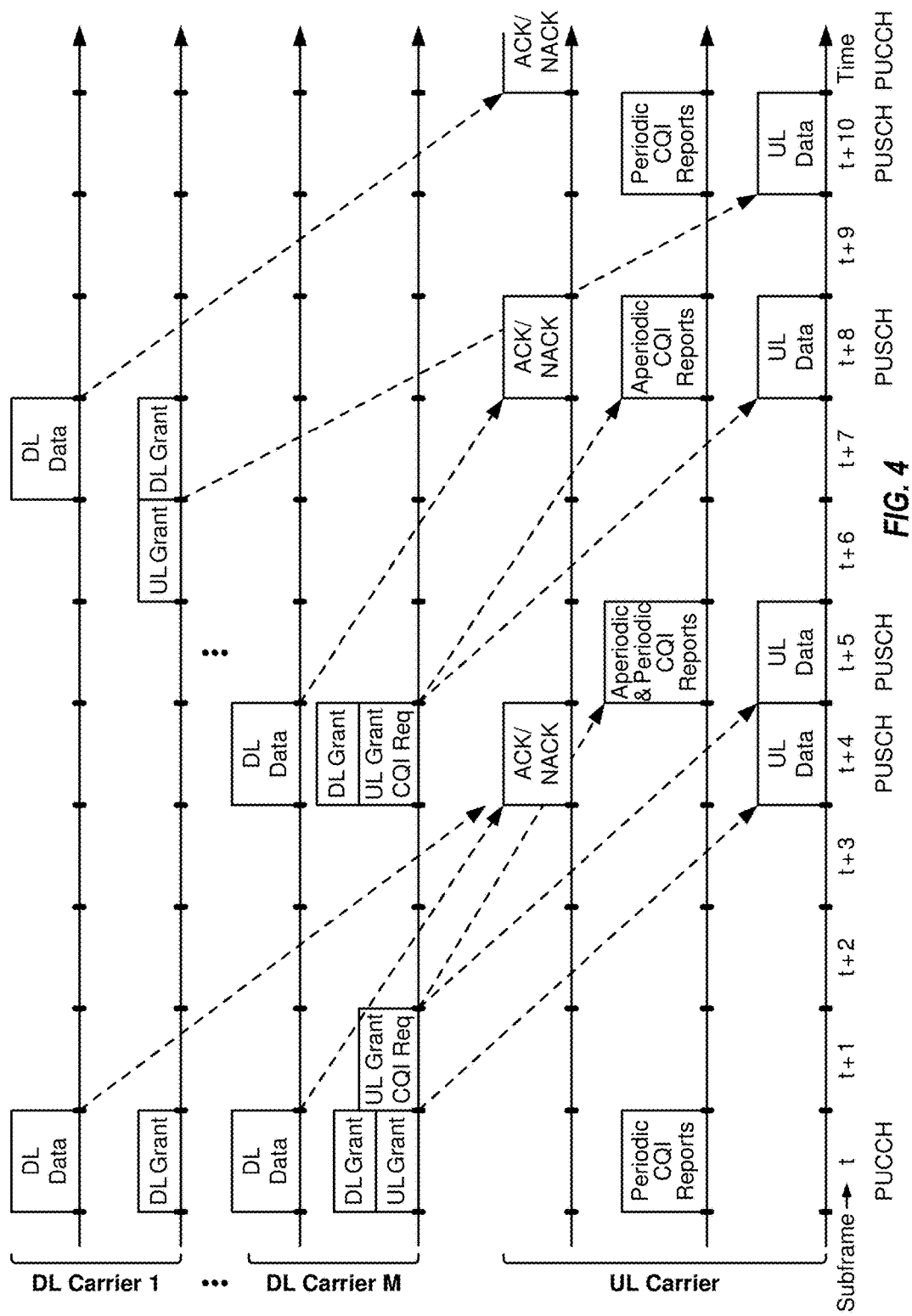
FIG. 4 shows a scheme for transmitting data on multiple downlink carriers and transmitting control information and data on one uplink carrier.

FIG. 4 shows a scheme for transmitting data on multiple (M) downlink carriers with HARQ and transmitting control information and data on one uplink carrier. A UE may periodically estimate the channel quality of different downlink carriers for an eNB and may determine CQI, PMI, and/or RI for each downlink carrier. RI for a downlink carrier may indicate the number of layers (i.e., L layers, where L≥1) to use for transmission of data on the downlink carrier. Each layer may be viewed as a spatial channel. PMI for a downlink carrier may indicate a precoding matrix or vector to use for precoding data prior to transmission on the downlink carrier. CQI for a downlink carrier may indicate a channel quality for each of at least one packet (e.g., P packets, where L≥P≥1) to send on the downlink carrier. The UE may periodically send CQI/PMI/RI for each downlink carrier to the eNB and/or may send CQI/PMI/RI for one or more downlink carriers whenever requested. As used herein, "CQI/PMI/RI" may refer to any combination of CQI, PMI and RI, such as only CQI, only PMI, only RI, both CQI and PMI, or all of CQI, PMI and RI. As used herein, "CQI/PMI" may refer to only CQI, only PMI, or both CQI and PMI.

The eNB may receive the CQI/PMI/RI for all downlink carriers from the UE. The eNB may use the CQI/PMI/RI and/or other information to select the UE for transmission of data, to schedule the UE on one or more downlink carriers and/or the uplink carrier, and to select one or more MCSs for each carrier on which the UE is scheduled. The eNB may process (e.g., encode and modulate) one or more packets for each selected downlink carrier based on the one or more MCSs selected for that downlink carrier. The eNB may then send a data transmission of one or more packets on each selected downlink carrier to the UE.

The UE may receive and decode the data transmission of one or more packets on each selected downlink carrier. The UE may determine whether each packet on each selected downlink carrier is decoded correctly or in error. The UE may obtain an ACK for each packet decoded correctly and a NACK for each packet decoded in error. The UE may send ACK/NACK comprising any combination of ACKs and/or NACKs obtained for the packets received on all selected downlink carriers. The eNB may receive the ACK/NACK from the UE, may terminate transmission of each packet for which an ACK is received, and may send another data transmission for each packet for which a NACK is received. The UE may also transmit data on the uplink carrier to the eNB when there is data to send and the UE is scheduled for transmission of data on the uplink carrier.

As shown in FIG. 4, the eNB may send a downlink (DL) grant for a data transmission on each downlink carrier to the UE. The downlink grant may include various parameters to use to receive and decode the data transmission on a particular downlink carrier. The eNB may also send an uplink (UL) grant for a data transmission from the UE on an uplink carrier. The uplink grant may include various parameters to use to generate and send the data transmission on the uplink carrier. The uplink grant may also include a CQI request. In this case, the UE may send CQI/PMI/RI along with data on the uplink carrier.

FIG. 4 shows an example in which ACK/NACK is sent four subframes after a data transmission. In general, the ACK/NACK delay may be any fixed or variable number of subframes. FIG. 4 also shows an example in which a data transmission is sent on the uplink four subframes after an uplink grant. In general, the uplink data delay may be any fixed or variable number of subframes.

As shown in FIG. 4, the UE may transmit data and/or control information, or neither, in any given subframe. The control information may comprise only CQI/PMI/RI, or only ACK/NACK, or both CQI/PMI/RI and ACK/NACK. The UE may be configured to periodically send CQI/PMI/RI for each downlink carrier of interest, which may be referred to as periodic CQI reporting. In this case, the UE may periodically send CQI reports in designated subframes determined by a schedule for periodic CQI reporting. Each CQI report may comprise CQI/PMI/RI for one downlink carrier. In one design, periodic CQI reporting may be configured separately for each downlink carrier, e.g., based on a CQI reporting configuration for that downlink carrier. In another design, periodic CQI reporting may be configured for a group of downlink carriers, e.g., based on a CQI reporting configuration for that group. The UE may also be requested to send CQI/PMI/RI for one or more downlink carriers in any subframe, which may be referred to as aperiodic CQI reporting. This may be achieved by including a CQI request for one or more downlink carriers in an uplink grant.

As shown in FIG. 4, the eNB may send control information (e.g., a downlink grant and/or an uplink grant) on a Physical Downlink Control Channel (PDCCH) on a downlink carrier to the UE. The eNB may send data on a Physical Downlink Shared Channel (PDSCH) on a downlink carrier to the UE. The UE may send only control information (e.g., CQI/PMI/RI and/or ACK/NACK) on the PUCCH on an uplink carrier to the eNB. The UE may send only data or both data and control information on the PUSCH on an uplink carrier to the eNB.

In the example shown in FIG. 4, the UE sends periodic CQI reports on the PUCCH in subframe t. The UE sends ACK/NACK and data on the PUSCH in subframe t+4. The UE sends CQI reports and data on the PUSCH in each of subframes t+5 and t+10. The UE sends CQI reports, ACK/NACK, and data on the PUSCH in subframe t+8 and sends ACK/NACK on the PUCCH in subframe t+11. In general, a UE may be configured with any number of downlink carriers and any number of uplink carriers for multi-carrier operation. Control information for any number of downlink carriers may be sent on one or more uplink carriers.

A relatively large amount of control information may be generated in multi-carrier operation. The present disclosure presents techniques to handle control information in multi-carrier operation. These techniques may include prioritizing and multiplexing different types of control information for multiple carriers, encoding the multiplexed control information jointly or separately, and mapping the result to one or more layers of a designated uplink carrier. Also, advantageously, a single carrier uplink waveform can be maintained.

In a first design, control information for all downlink carriers may be sent on a single uplink carrier, which may be determined in various manners. In one design, one uplink carrier may be designated as a primary uplink carrier and may carry control information for all downlink carriers. In another design, the uplink carriers may be assigned different priorities, and the active carrier with the highest priority among all active uplink carriers may carry control information for all downlink carriers. For example, the uplink carriers may be assigned priorities based on their indices, and the active carrier with the lowest index among all active uplink carriers may be used to send control information for all downlink carriers. In yet another design, the uplink carrier on which to send control information may be specified by the eNB. For example, an uplink grant may indicate a specific uplink carrier on which to transmit data, and control information for all downlink carriers may be multiplexed with data and sent on this uplink carrier. In yet another design, an uplink carrier with the highest data rate or spectral efficiency may be selected to carry control information for all downlink carriers. The uplink carrier on which to send control information for all downlink carriers may also be determined in other manners.

In a second design, control information for all downlink carriers may be sent on multiple uplink carriers. In one design, the downlink carriers may be mapped to the uplink carriers based on predetermined mapping rules. The mapping rules may be semi-static or dynamic and may indicate a specific uplink carrier to which each downlink carrier is mapped, e.g., as shown in FIG. 2. Downlink carriers may also be mapped to uplink carriers in other manners. Each uplink carrier may carry control information for a set of downlink carriers mapped to that uplink carrier.

Regardless of how downlink carriers are mapped to uplink carrier(s), a single uplink carrier may carry control information for multiple downlink carriers mapped to that uplink carrier. This uplink carrier may be the primary uplink carrier, the active uplink carrier with the highest priority, the uplink carrier indicated by an uplink grant, the uplink carrier with the highest data rate, the uplink carrier to which a set of downlink carriers is mapped (e.g., by higher layer signaling), or an uplink carrier determined in other manners. In general, control information for any number of downlink carriers may be sent on a single uplink carrier. The control information for each downlink carrier may include CQI/PMI/RI and/or ACK/NACK. The CQI/PMI/RI for each downlink carrier may be due to periodic CQI reporting and/or aperiodic CQI reporting.

Figure 5A:
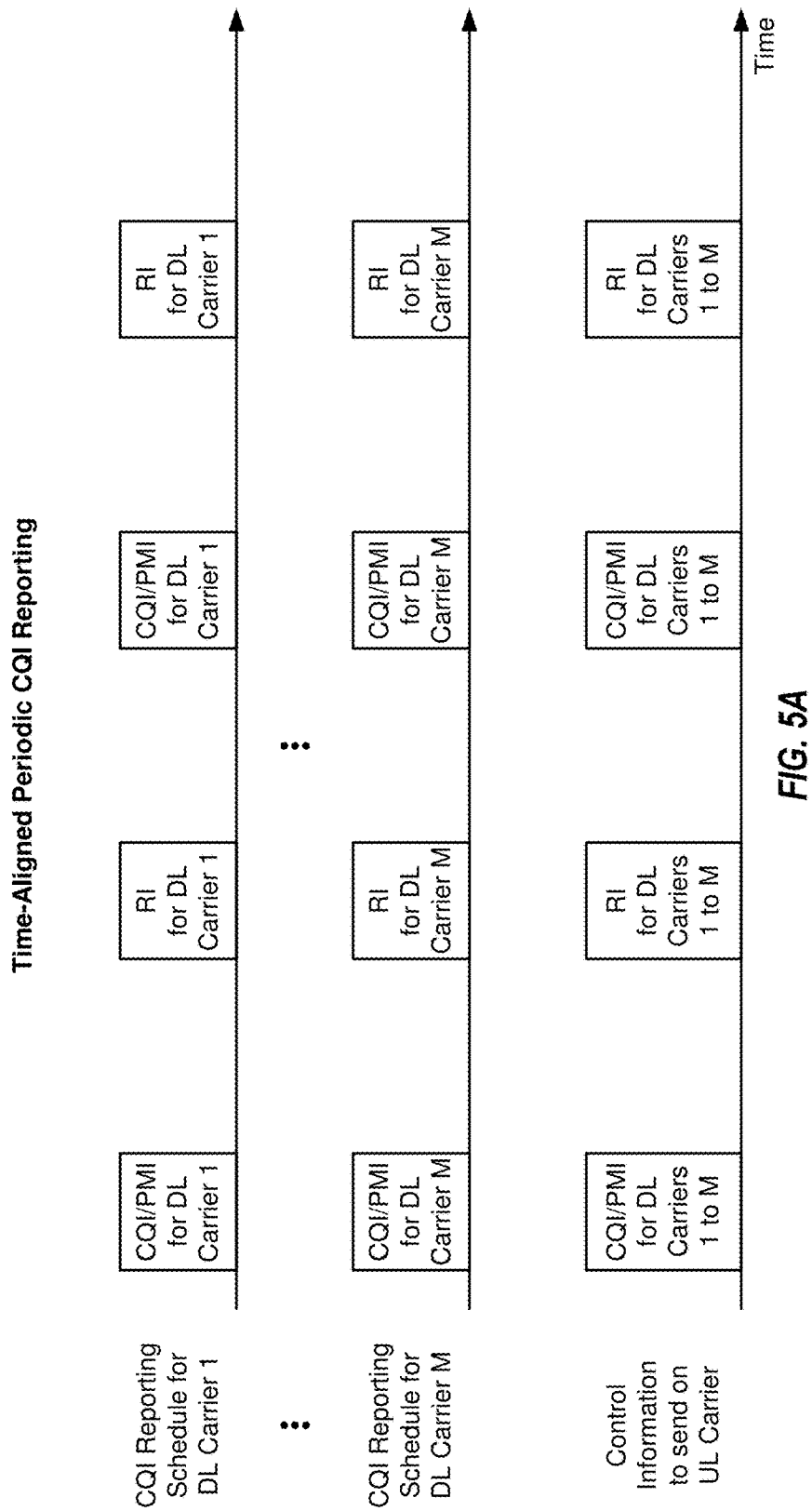
FIG. 5A shows an example of time-aligned periodic CQI reporting.

FIG. 5A shows an example of time-aligned periodic CQI reporting for multiple downlink carriers 1 to M mapped to one uplink carrier, where M may be any value greater than one. A UE may be configured for periodic CQI reporting for each of the M downlink carriers. The UE may send CQI/PMI/RI for each downlink carrier based on a CQI reporting schedule for that downlink carrier. The CQI reporting schedule may indicate how often and in which subframes to send CQI/PMI/RI. A subframe in which CQI/PMI/RI is reported may be referred to as a reporting subframe.

In the example shown in FIG. 5A, the same CQI reporting schedule may be used for all M downlink carriers. The UE may send CQI reports comprising CQI/PMI/RI for the M downlink carriers on one uplink carrier in one subframe in each CQI reporting interval of S subframes, where S may be a configurable value. For periodic CQI reporting, the UE may send either CQI/PMI or RI for a downlink carrier in one reporting subframe and may alternate between CQI/PMI and RI in consecutive reporting subframes. For example, the UE may send CQI/PMI for a downlink carrier in subframe t, then RI for the downlink carrier in subframe t+S, then CQI/PMI for the downlink carrier in subframe t+2S, then RI for the downlink carrier in subframe t+3S, and so on.

Figure 5B:
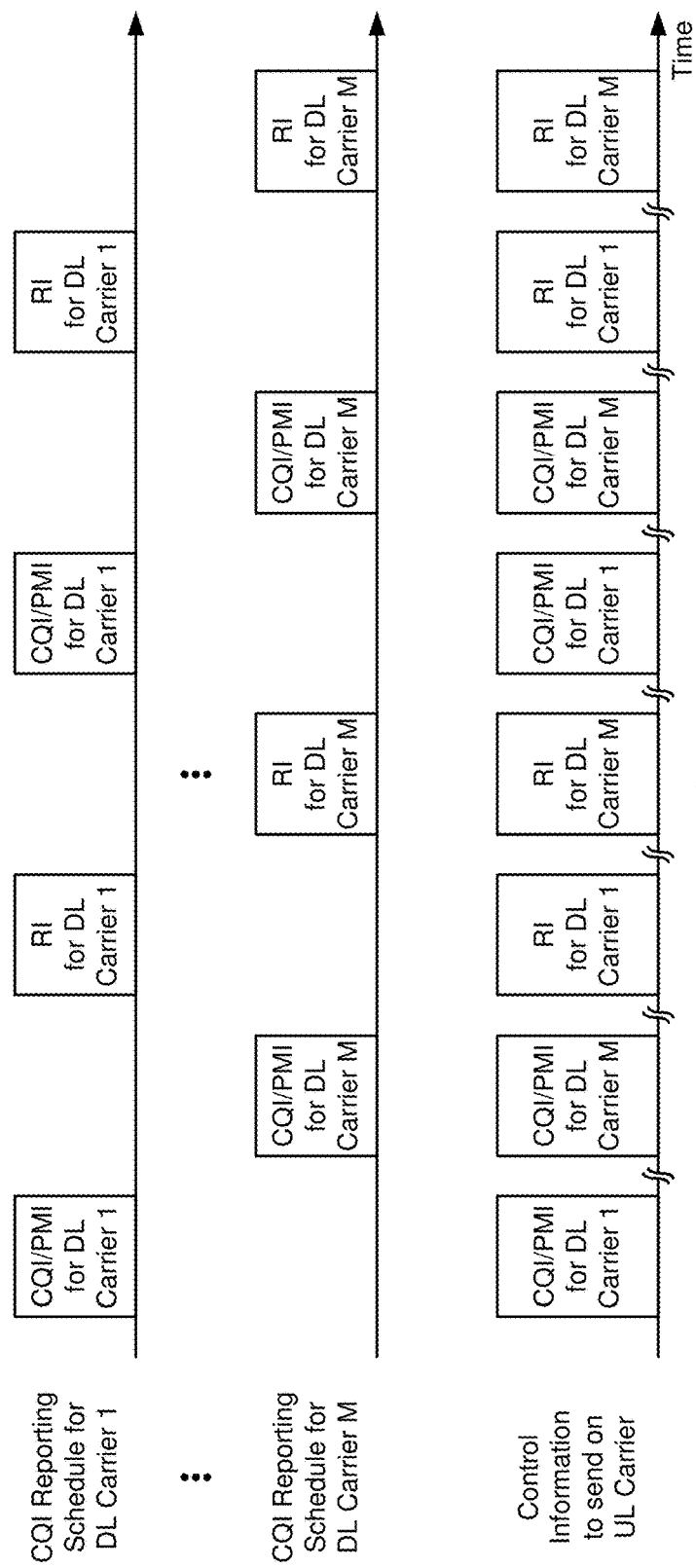
FIG. 5B shows an example of staggered periodic CQI reporting.

FIG. 5B shows an example of staggered periodic CQI reporting for multiple downlink carriers 1 to M mapped to one uplink carrier. A UE may be configured for periodic CQI reporting for each of the M downlink carriers. In the example shown in FIG. 5B, different CQI reporting schedules may be used for the M downlink carriers, and the reporting subframes for the M downlink carriers may be staggered in time. The CQI/PMI/RI for the M downlink carriers may thus be time division multiplexed (TDMed). Hence, the UE may send either CQI/PMI or RI for only one downlink carrier on one uplink carrier in any given subframe.

Figure 5C:
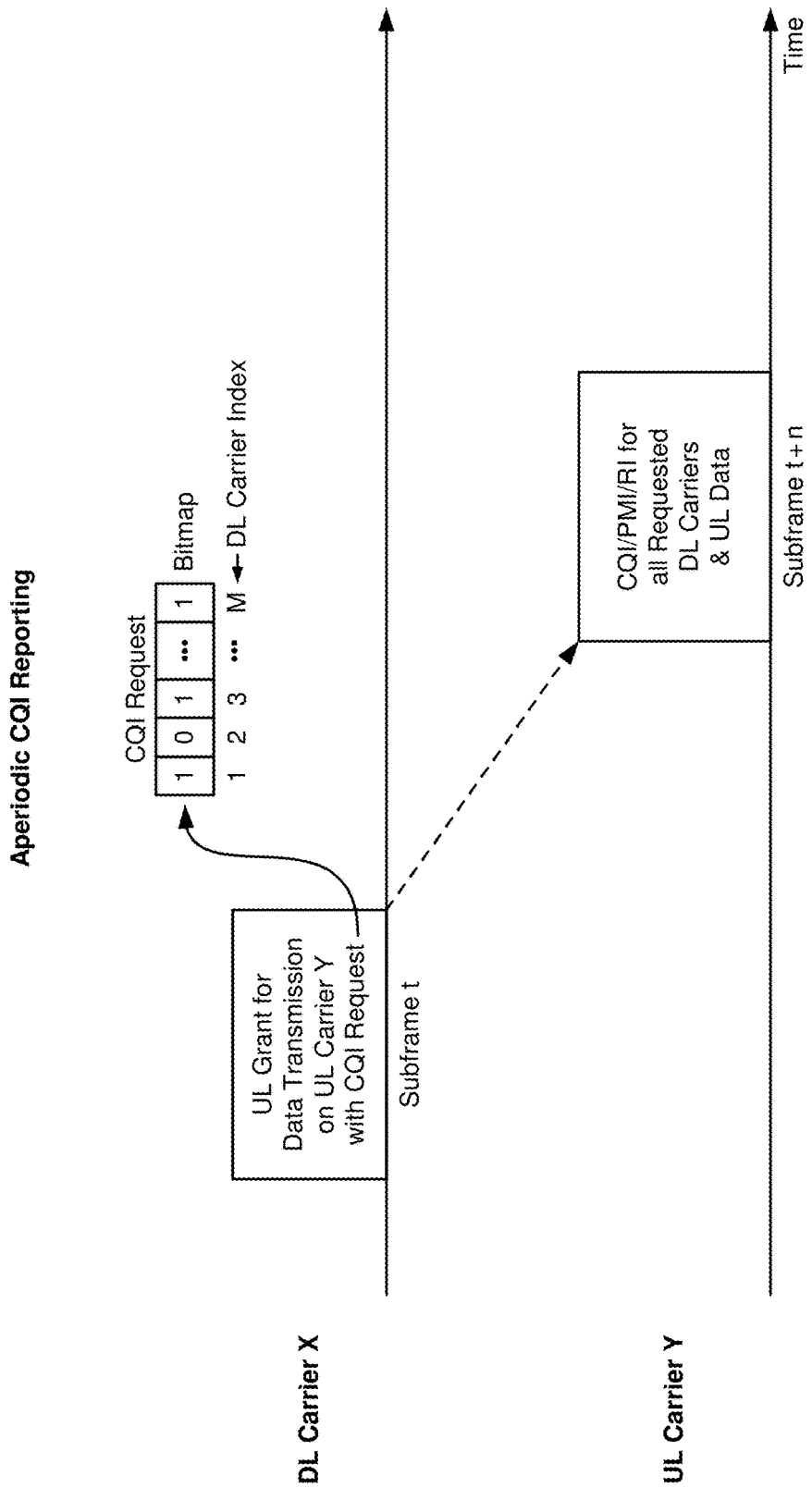
FIG. 5C shows an example of aperiodic CQI reporting.

FIG. 5C shows an example of aperiodic CQI reporting for multiple downlink carriers on one uplink carrier. An uplink grant may be sent on one downlink carrier X to schedule a UE for transmission of data on one uplink carrier Y. Uplink carrier Y may be associated with downlink carrier X or may be specified in the uplink grant. The uplink grant may include a CQI request. In one design, for multi-carrier operation, the CQI request may comprise a bitmap having a set of bits for a set of downlink carriers for which CQI/PMI/RI can be requested. The bit for each downlink carrier may be set (i) to a first value (e.g., '1') to indicate CQI/PMI/RI is requested for that downlink carrier or (ii) to a second value (e.g., '0') to indicate CQI/PMI/RI is not requested for that downlink carrier. The downlink carriers for which CQI/PMI/RI is requested may also be indicated in other manners, e.g., by including an index of each downlink carrier for which CQI/PMI/RI is requested in the uplink grant. The UE may send CQI/PMI/RI for all requested downlink carriers. The UE may receive the uplink grant in subframe t and may send data and CQI/PMI/RI for all requested downlink carriers in subframe t+n, where n may be equal to four or some other value.

A UE may send CQI/PMI/RI for multiple downlink carriers and data on one uplink carrier in the same subframe in various scenarios. In a first scenario, the UE may be scheduled for transmission of data on the uplink via an uplink grant without a CQI request, and periodic CQI reports for multiple downlink carriers may be due (e.g., as shown in FIG. 5A). In a second scenario, the UE may be scheduled for transmission of data on the uplink via an uplink grant with a CQI request for multiple downlink carriers, and aperiodic CQI reports for the multiple downlink carriers may be due. In a third scenario, the UE may be scheduled for transmission of data on the uplink via an uplink grant with a CQI request for at least one downlink carrier, and one or more periodic CQI reports for one or more downlink carriers may be due.

In the third scenario, periodic and aperiodic CQI reports for multiple downlink carriers may be due, and the UE may check to avoid sending duplicate CQI/PMI/RI. In one design, for each downlink carrier for which a periodic CQI report is due and for which an aperiodic CQI report is also requested, the UE may drop the periodic CQI report since the aperiodic CQI report may be more comprehensive and/or may have higher priority. In particular, the periodic CQI report may include only CQI/PMI or only RI whereas the aperiodic CQI report may include both CQI/PMI and RI. The UE may then send either a periodic CQI report or an aperiodic CQI report for each downlink carrier. The UE may send periodic CQI reports for a first set of U downlink carriers x1 to xU and may send aperiodic CQI reports for a second set of V downlink carriers y1 to yV, where U≥1, V≥1, and the intersection of set {x1, . . . , xU} and set {y1, . . . , yV} is an empty set. In another design, an aperiodic CQI report for one downlink carrier may be sent instead of a periodic CQI report for another downlink carrier.

In one design, the UE may send CQI/PMI/RI for all downlink carriers and data on one uplink carrier in one subframe. In another design, the UE may send CQI/PMI/RI for only some of the downlink carriers and data on one uplink carrier in one subframe, e.g., in order to reduce the amount of control information to send. In this design, the downlink carriers may be assigned priorities based on their indices, the type of CQI report to send, etc. The CQI/PMI/RI for one or more downlink carriers with the highest priority may be sent.

In one design, the UE may send control information of all types for all downlink carriers. In another design, the UE may send control information of certain types and may drop control information of other types, e.g., in order to reduce the amount of control information to send. For example, the UE may send ACK/NACK for all downlink carriers and may drop CQI/PMI/RI for one or more downlink carriers.

For all scenarios described above, a UE may send CQI/PMI/RI for multiple downlink carriers and data on one uplink carrier in one subframe. The UE may also send ACK/NACK for one or more downlink carriers on which data is received by the UE.

A UE may send control information for multiple downlink carriers and data on one uplink carrier in various manners. The control information for each downlink carrier may include one or more of CQI, PMI, RI and ACK/NACK. The UE may send the same or different combinations of CQI, PMI, RI and ACK/NACK for different downlink carriers. For example, the UE may send either CQI/PMI or RI for each downlink carrier for which a periodic CQI report is due and may send both CQI/PMI and RI for each downlink carrier for which an aperiodic CQI report is requested.

In a first control transmission design, a UE may send control information for multiple downlink carriers and data on the PUSCH and one or more PUCCHs on one uplink carrier. In one design, control information for each downlink carrier may be sent on a separate PUCCH, and data may be sent on the PUSCH. In another design, control information for one downlink carrier and data may be sent on the PUSCH, the control information for each remaining downlink carrier may be sent on a separate PUCCH. In yet another design, control information for two or more downlink carriers may be multiplexed and sent on one PUCCH. For example, CQI/PMI for one downlink carrier and ACK/NACK for another downlink carrier may be multiplexed and sent on one PUCCH. Control information for multiple downlink carriers and data may also be sent on the PUSCH and one or more PUCCHs in other manners.

The UE may concurrently transmit the PUSCH and one or more PUCCHs on one uplink carrier in various manners. In one design, the UE may allocate its available transmit power to the PUSCH and one or more PUCCHs such that good performance can be achieved. In another design, the UE may allocate more transmit power to each PUCCH with higher priority and less transmit power to the PUSCH and each PUCCH with lower priority. For example, the UE may allocate more transmit power to each PUCCH carrying ACK/NACK and less transmit power to each PUCCH carrying only CQI/PMI/RI. The UE may also concurrently transmit the PUSCH and one or more PUCCHs on one uplink carrier in other manners.

In a second control transmission design, a UE may send control information for multiple downlink carriers multiplexed with data on only the PUSCH on one uplink carrier in one subframe. This design may allow the UE to maintain a single-carrier waveform, which may result in a lower PAPR over the first control transmission design. The lower PAPR may improve performance, e.g., may allow a power-limited UE to transmit at a higher power level. The control information for multiple downlink carriers may be coded, multiplexed with data, and mapped to resource elements for the PUSCH on one uplink carrier in various manners.

In a first coding design, control information of each type for multiple downlink carriers may be multiplexed (or aggregated) and jointly coded. In this design, a UE may multiplex CQI/PMI for all downlink carriers and may jointly encode the multiplexed CQI/PMI. The UE may similarly multiplex RI for all downlink carriers and may jointly encode the multiplexed RI. The UE may also aggregate ACK/NACK for all downlink carriers and may jointly encode the aggregated ACK/NACK.

CQI/PMI/RI for a given downlink carrier may be dependent on various factors such as a data transmission mode configured for the downlink carrier, a periodic CQI reporting configuration for the downlink carrier, etc. The data transmission mode may indicate various parameters for transmission of data on the downlink carrier, such as whether spatial multiplexing is supported on the downlink carrier, the maximum number of packets that can be sent simultaneously on the downlink carrier, etc. The data transmission mode may influence which type of control information (e.g., only CQI, or all of CQI, PMI and RI) to send for the downlink carrier. The data transmission mode may also influence the size of control information (i.e., the payload size) of one or more types. For example, RI may comprise one bit if up to two spatial layers are supported for the PDSCH on the downlink carrier, two bits if up to four spatial layers are supported, or three bits if up to eight spatial layers are supported. Similarly, the periodic CQI reporting configuration for a downlink carrier may indicate which type(s) of control information to send and possibly the payload size of each control information type.

Figures 6A, 6B:
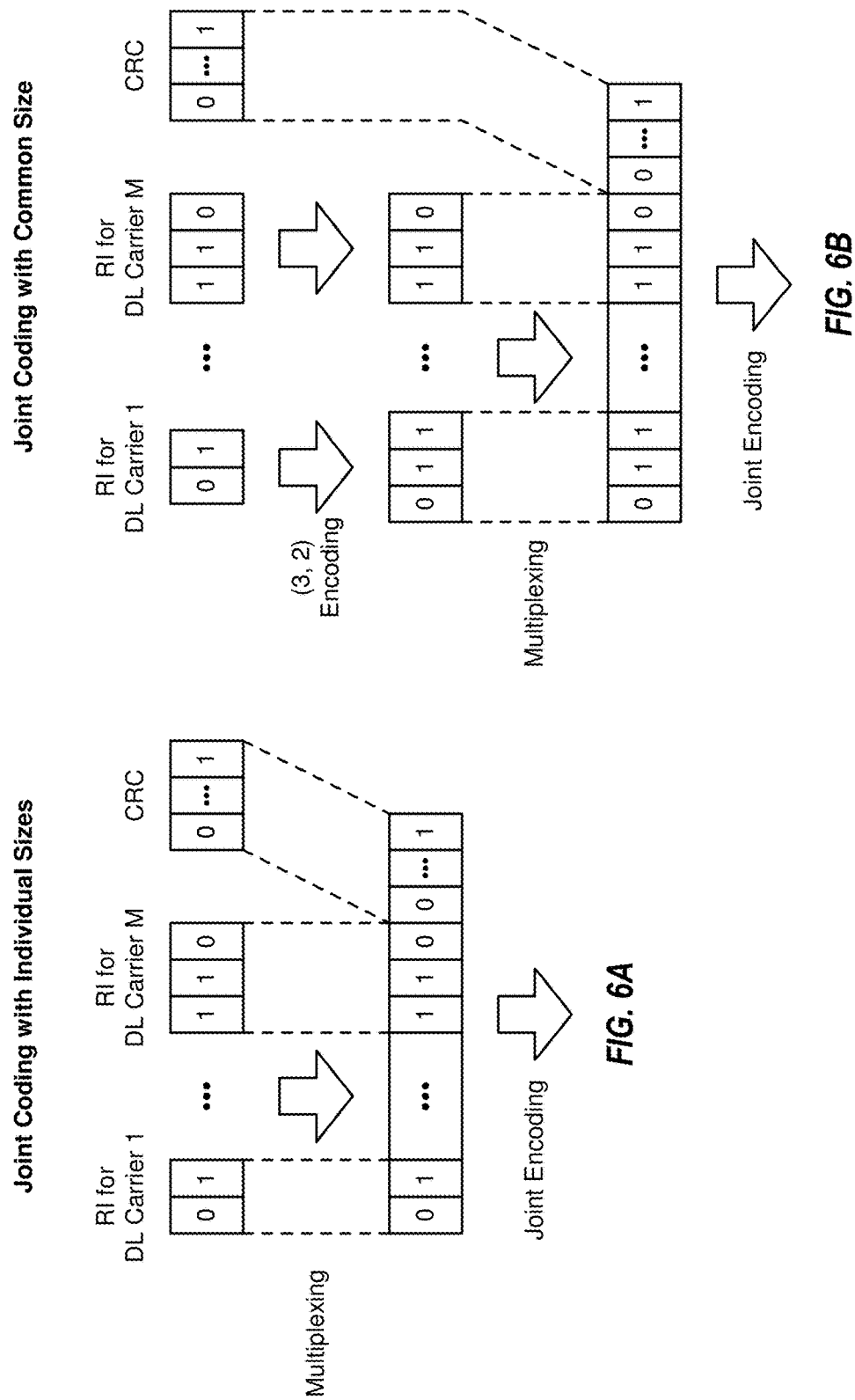
FIG. 6A shows joint coding of control information with individual payload sizes.
FIG. 6B shows joint coding of control information with a common payload size.

FIG. 6A shows a first design of joint coding for control information of a particular type for multiple (M) downlink carriers. In this design, control information of the particular type (e.g., CQI/PMI or RI) for all downlink carriers may be multiplexed based on a predetermined order. The predetermined order may be fixed and may be determined based on the indices of the downlink carriers or some other rule. The predetermined order may also be variable and may change over time (e.g., from subframe to subframe) to improve randomness. Control information of the particular type for different downlink carriers may have different payload sizes, as shown in FIG. 6A. The multiplexed control information of the particular type for all M downlink carriers may be jointly encoded to obtain coded information for the particular type.

For clarity, FIG. 6A shows joint coding of RIs for M downlink carriers. RIs for all M downlink carriers 1 to M may be multiplexed together. The multiplexed RIs for the M downlink carriers may then be jointly encoded.

FIG. 6B shows a second design of joint coding for control information of a particular type for multiple (M) downlink carriers. In this design, a common payload size may be used for all downlink carriers. The common payload size may be the largest payload size for the control information type among all downlink carriers, or a default payload size, or a payload size determined in other manners. Control information of the particular type (e.g., CQI/PMI or RI) for each downlink carrier may be zero padded or encoded to match the common payload size. Control information of the particular type for all downlink carriers (after zero padding or coding) may then have the same payload size and may be multiplexed together in a predetermined order. The multiplexed control information of the particular type for all M downlink carriers may be jointly encoded to obtain coded information for the particular type.

For clarity, FIG. 6B shows joint coding of RIs for M downlink carriers 1 to M with a common payload size of 3 bits. 2-bit RI for downlink carrier 1 may be coded with a block code to obtain 3 bits. 3-bit RI for downlink carrier M may be provided without zero padding or coding. RI for each remaining downlink carrier (if any) may be provided directly or encoded with a block code to obtain 3 bits. RIs for downlink carriers 1 to M (after coding) may be multiplexed together. The multiplexed RIs for the M downlink carriers may be jointly encoded.

For each of the joint coding designs shown in FIGS. 6A and 6B, a cyclic redundancy check (CRC) may be computed based on control information of the particular type for all M downlink carriers. The CRC may be used for error detection and may be appended to the multiplexed control information of the particular type. The multiplexed control information and the CRC may be jointly encoded to obtain coded information. A CRC may be used for only certain types of control information (e.g., only CQI/PMI) or all types of control information. A CRC may also be used for only certain payload sizes (e.g., when the payload size exceeds a particular number of bits) or all payload sizes.

There may be reconfiguration of data transmission mode and/or periodic CQI reporting for one or more downlink carriers, e.g., via Radio Resource Control (RRC). An eNB may send signaling for reconfiguration at a first time instant, and a UE may implement the reconfiguration at a second time instant, which may be unknown to the eNB. There may thus be an uncertainty period during which the eNB does not know the payload size of one or more control information types for one or more downlink carriers. For example, reconfiguration of a downlink carrier may result in a change from 3-bit RI to 2-bit RI. The eNB may not know whether a 3-bit RI or a 2-bit RI is sent by the UE for the downlink carrier during the uncertainty period.

The uncertainty in payload size during reconfiguration may be addressed in various manners. In one design, an eNB may perform decoding for all possible payload sizes during reconfiguration. For example, if reconfiguration results in two possible payload sizes for each of three downlink carriers, then the eNB may perform decoding for eight possible combinations of payload sizes for the three downlink carriers. The eNB may thus perform multiple hypotheses testing by checking all possible payload sizes. This design may be used for the joint coding design shown in FIG. 6A.

In another design of addressing uncertainty in payload size during reconfiguration, a common payload size may be assumed during the uncertainty period. Control information of the particular type for all downlink carriers may have the same size, may be multiplexed together in a predetermined order, and may be jointly encoded, as shown in FIG. 6B. By matching the payload size for all downlink carriers and multiplexing in a predetermined order, the eNB can receive control information for all downlink carriers without having to perform blind decoding. For each downlink carrier that is reconfigured, the eNB may check multiple possibilities for this downlink carrier. For downlink carriers not affected by reconfiguration, the eNB may know the payload size, which is not affected by reconfiguration of the other downlink carriers.

ACK/NACK for a given downlink carrier may also be dependent on various factors such as the data transmission mode configured for the downlink carrier. The data transmission mode may indicate the number of packets (or codewords) to send on the downlink carrier, and hence the number of ACKs and/or NACKs to send back.

ACK/NACK for multiple downlink carriers may be sent on one uplink carrier in various manners. In a first design, ACK/NACK for multiple downlink carriers may be multiplexed and then jointly encoded, e.g., as shown in FIG. 6A or 6B. In a second design, spatial bundling and/or carrier bundling may be performed to reduce the number of ACK/NACK bits to send. Spatial bundling may be performed for each downlink carrier whereas carrier bundling may be performed across downlink carriers for each packet/codeword. The bundled ACK/NACK bits may be sent with or without coding. For example, spatial bundling may be performed for each downlink carrier as described below, and M bundled ACK/NACK bits for the M downlink carriers may be jointly encoded.

A UE may perform spatial bundling for a given downlink carrier as follows. The UE may first determine an ACK or a NACK for each packet received on the downlink carrier based on whether the packet was decoded correctly or in error. The UE may then bundle the ACKs and/or NACKs for all packets received on the downlink carrier to obtain one bundled ACK or NACK. For example, the UE may obtain (i) a bundled ACK if ACKs are obtained for all packets received on the downlink carrier or (ii) a bundled NACK if a NACK if obtained for any packet received on the downlink carrier. An eNB may receive the bundled ACK or NACK from the UE. The eNB may terminate transmission of all packets if a bundled ACK is received and may send an additional transmission of all packets if a bundled NACK is received.

A UE may perform carrier bundling across multiple downlink carriers as follows. For simplicity, the following description assumes that one packet is sent on each downlink carrier. The UE may first determine an ACK or a NACK for the packet received on each downlink carrier based on whether the packet was decoded correctly or in error. The UE may then bundle the ACKs and/or NACKs for the packets received on all downlink carriers to obtain one bundled ACK or NACK. For example, the UE may obtain (i) a bundled ACK if ACKs are obtained for the packets received on all downlink carriers or (ii) a bundled NACK if a NACK if obtained for a packet received on any downlink carrier. An eNB may receive the bundled ACK or NACK from the UE. The eNB may terminate transmission of all packets on the multiple downlink carriers if a bundled ACK is received and may send additional transmissions of the multiple packets on all downlink carriers if a bundled NACK is received.

ACK/NACK for multiple downlink carriers may be sent with bundling in various manners. In a first bundling design, spatial bundling may be performed for each downlink carrier to obtain one bundled ACK/NACK for the downlink carrier. M bundled ACK/NACK bits may then be sent for packets received on M downlink carriers. In a second bundling design, carrier bundling may be performed across downlink carriers to obtain one bundled ACK/NACK for each packet or codeword. For example, P packets may be received on each of the M downlink carriers. ACKs and/or NACKs for the first packet received on the M carriers may be bundled to obtain a first bundled ACK or NACK. ACKs and/or NACKs for the second packet received on the M carriers may also be bundled to obtain a second bundled ACK or NACK. P bundled ACK/NACK bits may then be sent for P packets received on each of the M downlink carriers.

In one design, a downlink assignment index (DAI) field may be utilized in both downlink grants and uplink grants to facilitate detection of missing PDCCH. A missing PDCCH is a PDCCH transmission that is sent by an eNB to a UE but is not detected by the UE for whatever reason. The DAI field may be included in a downlink grant and may indicate an accumulative index of the PDCCH to be acknowledged by the UE. The DAI field may also be included in an uplink grant and may indicate the total number of subframes with PDSCH transmission.

A UE may be dynamically scheduled for transmission of data on the PUSCH via an uplink grant sent on the PDCCH. The total number of ACK/NACK bits to send on an uplink carrier may be set as X times the value of the DAI field in the uplink grant, where X stands for the maximum number of packets sent in one subframe on all downlink carriers. The UE may not be scheduled for data transmission on one or more downlink carriers in a given subframe but may nevertheless generate ACK/NACK for each downlink carrier that it is not scheduled. If the UE misses a downlink grant for a downlink carrier, then the UE may send NACK in the corresponding payload position for the downlink carrier. The UE may thus send NACK for a missed downlink assignment. A final ACK/NACK payload may be determined according to the number of configured downlink carriers and the configured transmission mode for each downlink carrier, which may be semi-static.

A UE may be semi-persistently scheduled for transmission of data on the PUSCH via upper layer signaling. The total number of ACK/NACK bits to send on one uplink carrier may be set as X times the number of downlink carriers mapped to the uplink carrier (for FDD) or the number of downlink subframes mapped to an uplink subframe (for TDD). NACK may be sent for each downlink carrier for which no downlink grant is detected, as described above.

In a second coding design, control information for each of multiple downlink carriers may be separately (i.e., independently) coded. In one design, a UE may aggregate all control information (e.g., CQI, PMI, RI and/or ACK/NACK) to send for each downlink carrier. The UE may then encode the aggregated control information for each downlink carrier. In another design, the UE may separately encode control information of each type for each downlink carrier. For example, the UE may separately encode CQI/PMI, separately encode RI, and separately encode ACK/NACK for a downlink carrier. For both designs, the UE may obtain M blocks of coded information for M downlink carriers.

In a third coding design, a combination of joint coding and separate coding may be performed on control information for multiple downlink carriers. In one design, joint coding may be performed for control information of certain types, and separate coding may be performed for control information of other types. For example, joint coding may be performed for ACK/NACK, and ACK/NACK for all downlink carriers may be multiplexed and then jointly encoded. Similarly, joint coding may be performed for CQI/PMI, and CQI/PMI for all downlink carriers may be jointly encoded, e.g., with a block code or a tail biting convolutional code (TBCC). In one design, joint coding may be performed for RI, and RI for all downlink carriers may be jointly encoded, e.g., as shown in FIG. 6A. In another design, separate coding may be performed for RI. For both designs, bundling may be avoided for RI information. It may be desirable to use joint coding for each type of control information having a relatively small payload size (e.g., RI and ACK/NACK). It may be desirable to use separate/independent coding for each type of control information having a larger payload size (e.g., CQI/PMI). Joint coding and separate coding may also be applied in other manners. Control information for multiple downlink carriers may be encoded based on any of the coding designs described above. Control information for the multiple downlink carriers (after coding) and data may be mapped to resources for the PUSCH on one uplink carrier in various manners.

Figure 7A:
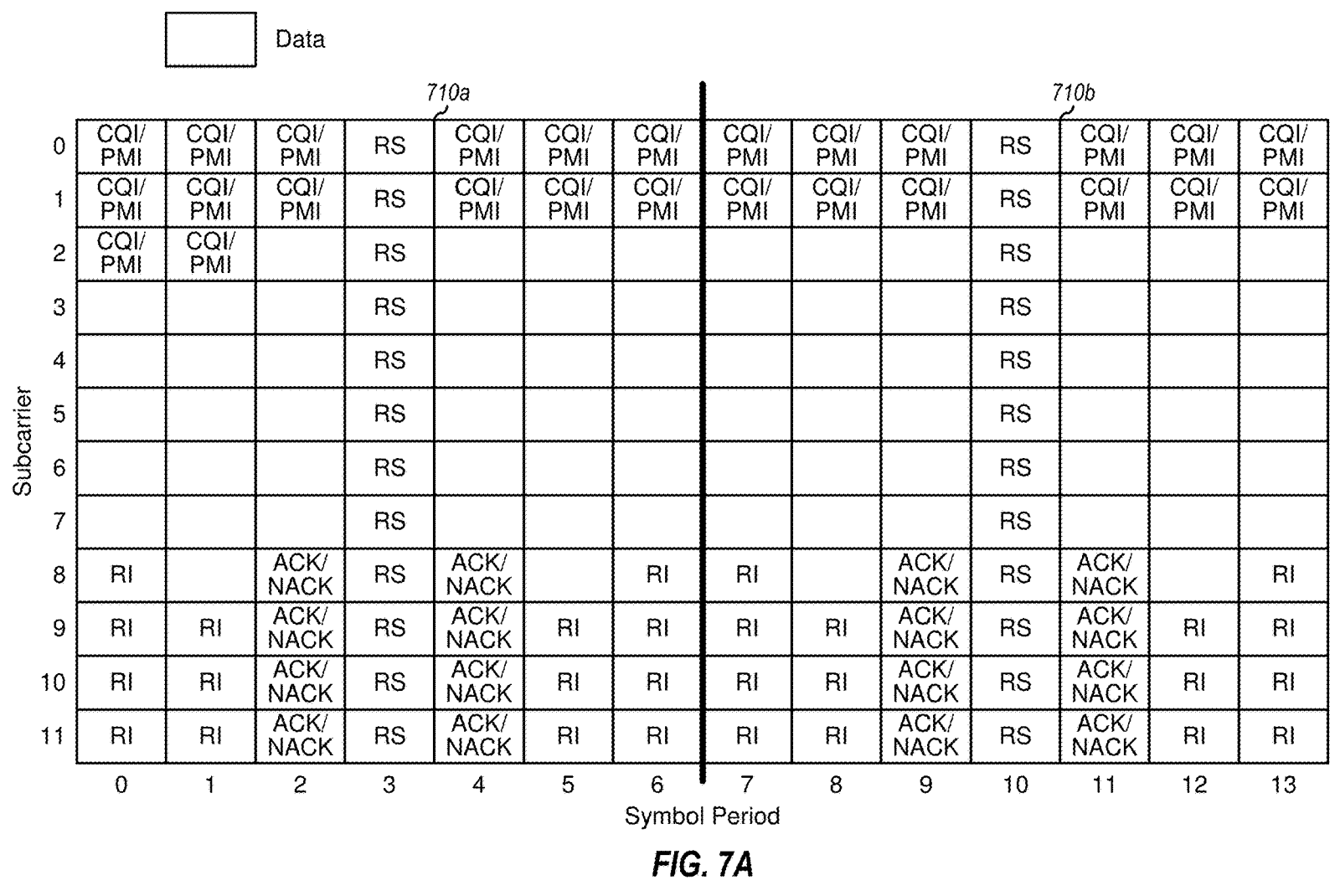

FIG. 7A shows a design of mapping control information for multiple downlink carriers and data to the PUSCH on one uplink carrier. The design in FIG. 7A may be used for the joint coding design. FIG. 7A shows a case in which each slot includes seven symbol periods for the normal cyclic prefix. The PUSCH may be sent on two resource blocks 710a and 710b in two slots of one subframe, with each resource block covering 12 subcarriers in one slot of 7 symbol periods. Resource blocks 710a and 710b may cover the same set of 12 subcarriers if frequency hopping is not enabled or different sets of subcarriers if frequency hopping is enabled. As shown in FIG. 7A, a reference signal (RS) may be sent on all resource elements in the middle symbol period of each resource block. Data and control information may be sent on resource elements in the remaining six symbol periods of each resource block.

As shown in FIG. 7A, control information of different types, such as CQI, PMI, RI, and/or ACK/NACK for multiple downlink carriers may be multiplexed with data in two resource blocks 710a and 710b and sent on the PUSCH. CQI/PMI for multiple downlink carriers (if sent) may be mapped to specific resource elements in two resource blocks 710a and 710b. Similarly, RI for multiple downlink carriers (if sent) may be mapped to other resource elements in resource blocks 710a and 710b. Furthermore, ACK/NACK for multiple downlink carriers (if sent) may be mapped to different resource elements in resource blocks 710a and 710b. Data may be mapped to the remaining resource elements in resource blocks 710a and 710b not used for reference signal or control information.

In general, the number of resource elements to use for control information of each type may be dependent on the number of downlink carriers being reported, the amount of control information of that type for each downlink carrier, the coding selected for the control information type, etc.

More resource elements may be used to send control information for more downlink carriers.

As shown in FIG. 7A, control information for multiple downlink carriers may be multiplexed with data in the time domain on the PUSCH. In each symbol period, 12 modulation symbols for data and control information may be multiplexed or arranged as shown in FIG. 7A and converted to the frequency domain with a 12-point discrete Fourier transform (DFT) to obtain 12 frequency-domain symbols. These 12 frequency-domain symbols may be mapped to 12 subcarriers covered by resource block 710a or 710b, and zero symbols with a value of zero may be mapped to the remaining subcarriers. A $N_{FFT}$-point inverse fast Fourier transform (IFFT) may then be performed on $N_{FFT}$ mapped symbols to obtain $N_{FFT}$ time-domain samples for a useful portion. The last $N_{CP}$ time-domain samples in the useful portion may be copied and appended to the front of the useful portion to obtain a SC-FDMA symbol comprising $N_{FFT}+N_{CP}$ samples. The SC-FDMA symbol has a single-carrier waveform and a low PAPR, which is desirable.

Figure 7B:
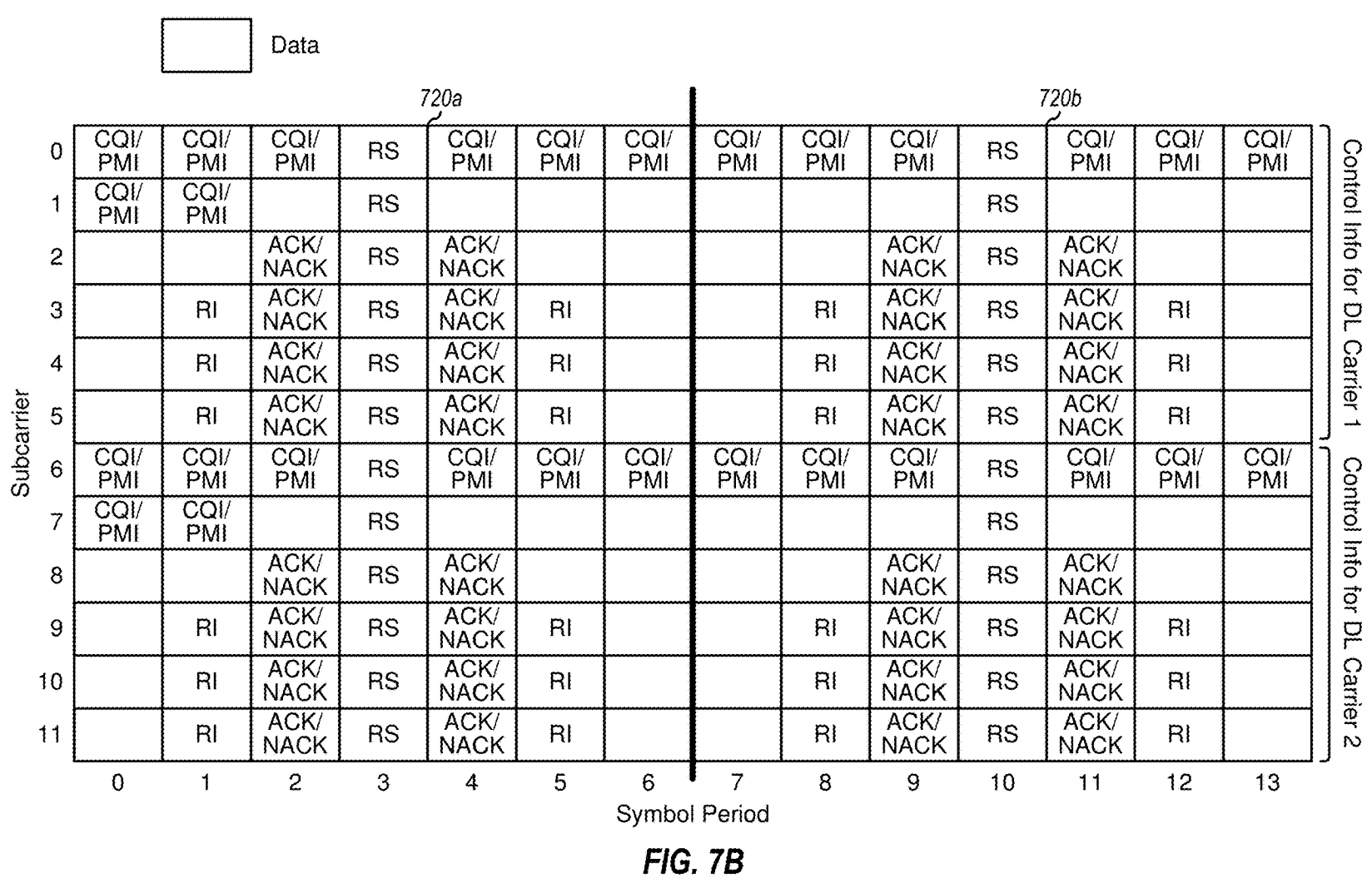

FIG. 7B shows another design of mapping control information for multiple downlink carriers and data to the PUSCH on one uplink carrier. The design in FIG. 7B may be used for the independent coding design. For clarity, FIG. 7B shows control information for two downlink carriers 1 and 2 and data being sent on the PUSCH on one uplink carrier. CQI/PMI, RI and ACK/NACK for downlink carrier 1 may be mapped to a first set of resource elements in the upper half of resource blocks 720a and 720b. CQI/PMI, RI and ACK/NACK for downlink carrier 2 may be mapped to a second set of resource elements in the lower half of resource blocks 720a and 720b. Data may be mapped to the remaining resource elements in resource blocks 710a and 710b not used for the reference signal or control information.

As shown in FIG. 7B, control information for different downlink carriers may be mapped to different locations of the PUSCH. The downlink carriers may be mapped to different locations of the PUSCH in various manners. In one design, the location of the PUSCH for each downlink carrier may be determined based on the indices of the downlink carriers. For example, the downlink carrier with a lower index may be mapped to the location in the upper half of the PUSCH, and the downlink carrier with a higher index may be mapped to the location in the lower half of the PUSCH.

Spatial multiplexing may be used for the PUSCH, and multiple layers (e.g., two or four layers) may be available for the PUSCH. Control information for multiple downlink carriers and data may be sent on the multiple layers of the PUSCH on one uplink carrier in various manners.

Figure 8A:
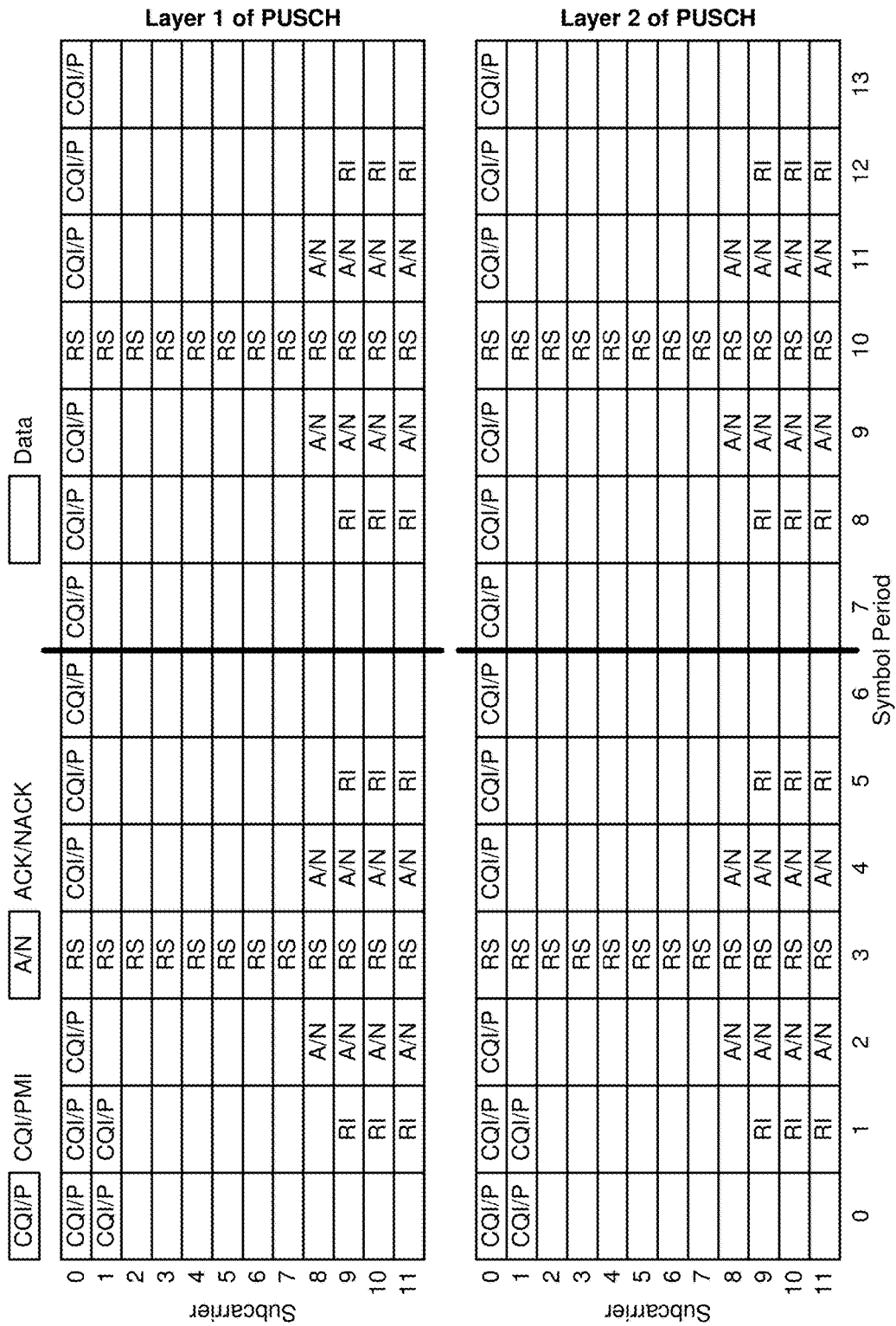
FIGS. 8A and 8B show two exemplary mappings of control information for multiple downlink carriers and data to two layers of the data channel.

FIG. 8A shows a design of mapping control information for multiple downlink carriers and data to multiple layers of the PUSCH on one uplink carrier. In general, P packets or codewords may be sent on L layers of the PUSCH, where L≥P≥1 and L>1. In one design, one packet may be sent on all L layers, and a different portion of the packet may be sent on each layer. Control information for multiple downlink carriers may be multiplexed with the packet and split (e.g., equally) among L layers. In another design, one packet may be sent on each layer. Control information for multiple downlink carriers may be split (e.g., equally) among L packets, and a different portion of the control information may be multiplexed with each packet.

For clarity, FIG. 8A shows control information for two downlink carriers 1 and 2 and data being sent on two layers 1 and 2 of the PUSCH on one uplink carrier. For the joint coding design, CQI/PMI for downlink carriers 1 and 2 may be jointly encoded, split between layers 1 and 2, and mapped to resource elements in the two layers as shown in FIG. 8A. Similarly, RI for downlink carriers 1 and 2 may be jointly encoded, split between layers 1 and 2, and mapped to resource elements in the two layers as shown in FIG. 8A. ACK/NACK for downlink carriers 1 and 2 may also be jointly encoded, split between layers 1 and 2, and mapped to resource elements in the two layers as shown in FIG. 8A. For the independent coding design, CQI/PMI, RI and ACK/NACK for downlink carrier 1 may be mapped to resource elements in layer 1, and CQI/PMI, RI and ACK/NACK for downlink carrier 2 may be mapped to resource elements in layer 2. For both joint and independent coding designs, data may be mapped to the remaining resource elements in layers 1 and 2 not used for the reference signal or control information.

Figure 8B:
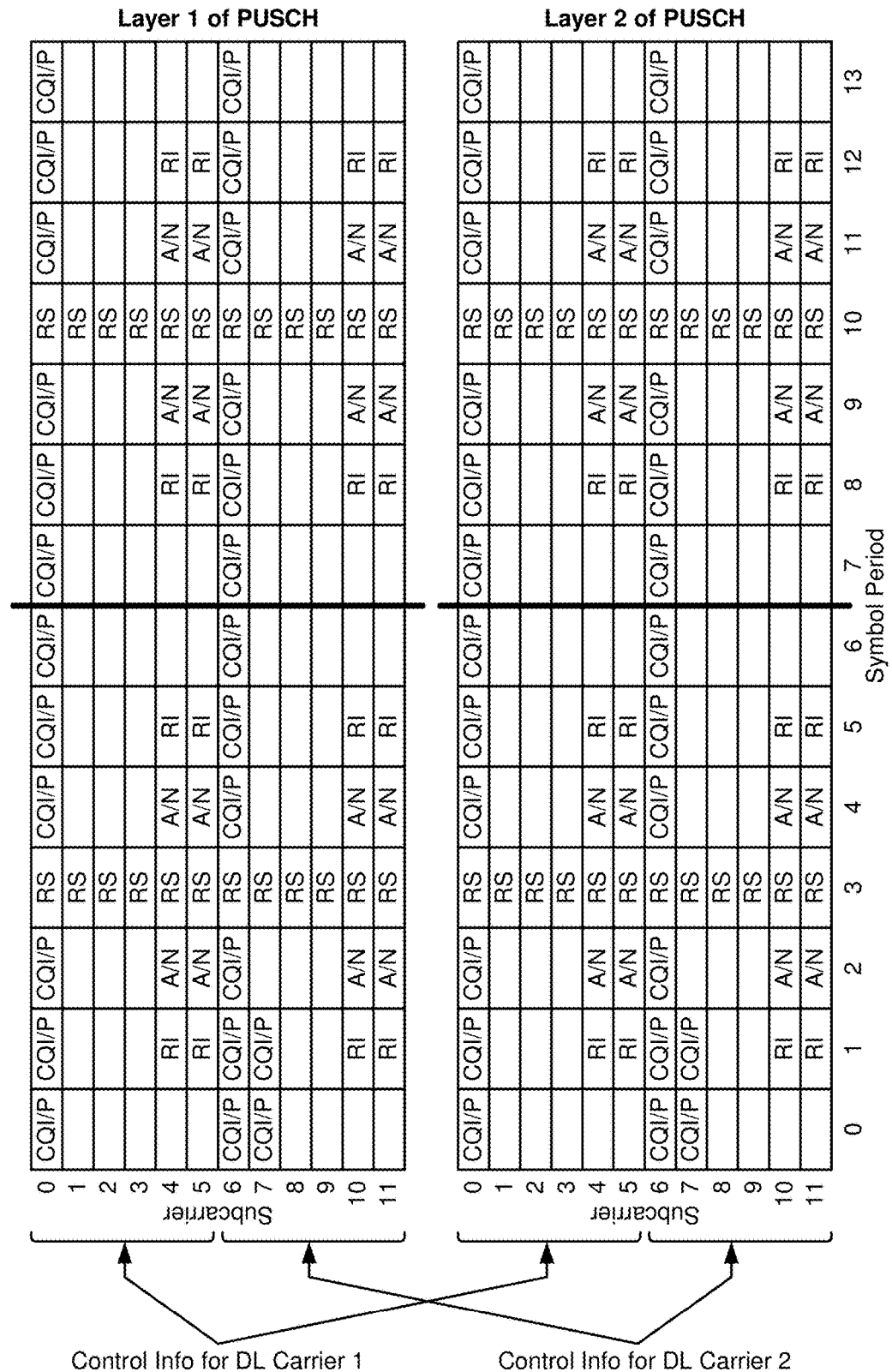

FIG. 8B shows another design of mapping control information for multiple downlink carriers and data to multiple layers of the PUSCH on one uplink carrier. The design in FIG. 8B may be used for the independent coding design. In this design, control information for each downlink carrier may be sent on all layers. Each layer may carry a portion of the control information for each of the multiple downlink carriers.

For clarity, FIG. 8B shows control information for two downlink carriers 1 and 2 and data being sent on two layers 1 and 2 of the PUSCH on one uplink carrier. Control information for downlink carrier 1 may be divided in half, the first half of the control information may be mapped to a first set of resource elements in layer 1, and the second half of the control information may be mapped to a first set of resource elements in layer 2. Similarly, control information for downlink carrier 2 may be divided in half, the first half of the control information may be mapped to a second set of resource elements in layer 1, and the second half of the control information may be mapped to a second set of resource elements in layer 2. Data may be mapped to the remaining resource elements in layers 1 and 2 not used for the reference signal or control information.

FIGS. 8A and 8B show exemplary mappings of control information for multiple downlink carriers to two layers of the PUSCH. Control information for multiple downlink carriers may also be mapped to multiple layers of the PUSCH in other manners. In one design, different types of control information may be mapped to different number of layers of the PUSCH. For example, CQI/PMI may be mapped to the one or more layers of the PUSCH used for one packet/codeword whereas RI and/or ACK/NACK may be mapped to all layers of the PUSCH.

FIGS. 7A to 8B show exemplary mappings of control information for multiple downlink carriers to resource elements for the PUSCH. Control information for multiple downlink carriers may also be mapped to resource elements for the PUSCH in other manners. It may be desirable to map control information of a type of greater importance (e.g., ACK/NACK) near the reference signal. It may also be desirable to map control information of each type to multiple symbol periods in order to obtain time diversity.

Wireless network 100 may utilize frequency division duplexing (FDD) or time division duplexing (TDD). For FDD, the downlink and uplink may be allocated separate carriers (or frequency channels). Downlink transmissions may be sent on one or more downlink carriers, and uplink transmissions may be sent concurrently on one or more uplink carriers. For TDD, the downlink and uplink may share the same one or more carriers, and each carrier may be used for both the downlink and uplink. Downlink and uplink transmissions may be sent on the same carrier(s) in different time periods in TDD. The techniques described herein may be used for FDD, as described above. The techniques may also be used for TDD.

For TDD, ACK/NACK for data transmissions sent on the PUSCH on multiple downlink carriers in multiple subframes and data for the uplink may be sent on the PUSCH on one uplink carrier in one subframe. Spatial bundling, carrier bundling, and/or subframe bundling may be performed to reduce the amount of ACK/NACK to send. A UE may perform subframe bundling as follows. For simplicity, the following description assumes that one packet is sent on one downlink carrier in each of N subframes. The UE may first determine an ACK or a NACK for the packet received on the downlink carrier in each subframe based on whether the packet was decoded correctly or in error. The UE may then bundle the ACKs and/or NACKs for the packets received on the downlink carrier in all N subframes to obtain one bundled ACK or NACK. For example, the UE may obtain (i) a bundled ACK if ACKs are obtained for the packets received on the downlink carrier in all N subframes or (ii) a bundled NACK if a NACK if obtained for a packet received on the downlink carrier in any subframe. Subframe bundling may be performed separately for each packet/codeword. For example, if P packets are sent on each of M downlink carriers in each of N subframes, then P bundled ACKs and/or NACKs may be obtained for the N*P packets sent on each of the M downlink carriers.

Figures 9, 10:
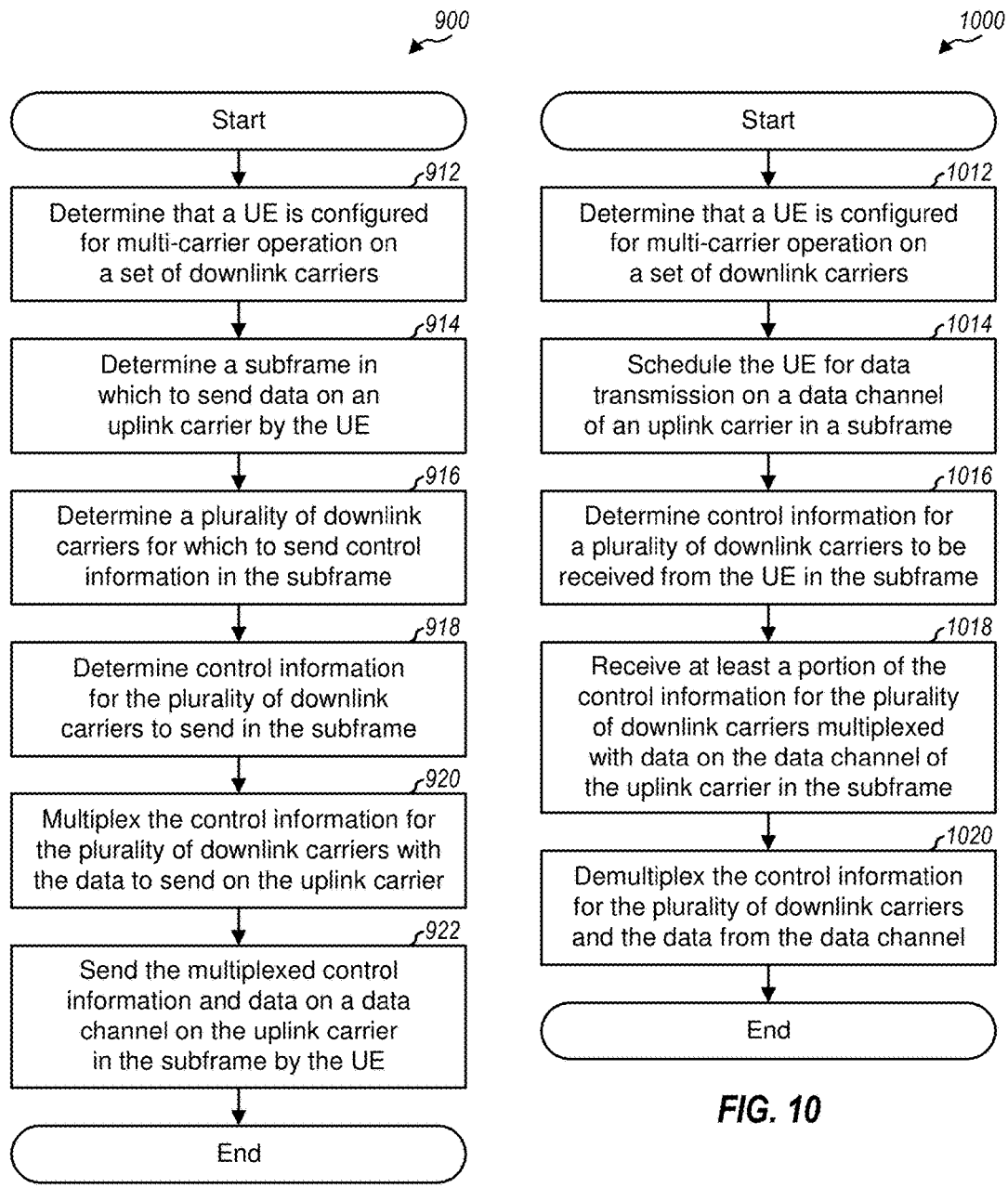
FIG. 9 shows a process for sending control information for multiple downlink carriers and data on a data channel on one uplink carrier.
FIG. 10 shows a process for receiving control information for multiple downlink carriers and data sent on a data channel on one uplink carrier.

FIG. 9 shows a design of a process 900 for sending control information for multiple downlink carriers and data. Process 900 may be performed by a UE (as described below) or by some other entity. The UE may determine that it is configured for multi-carrier operation on a set of downlink carriers (block 912). The UE may determine a subframe in which to send data on an uplink carrier (block 914). The UE may also determine a plurality of downlink carriers for which to send control information in the subframe (block 916). The plurality of downlink carriers may include all or some of the carriers in the set of carriers configured for the UE. The UE may determine control information for the plurality of downlink carriers to send in the subframe (block 918). The control information for the plurality of downlink carriers may include control information for each of the plurality of distinct downlink carriers. The UE may multiplex the control information for the plurality of downlink carriers with the data to send on the uplink carrier (block 920). The UE may then send the multiplexed control information and data on a data channel (e.g., the PUSCH) on the uplink carrier in the subframe (block 922).

In one design of block 914, the UE may receive an uplink grant to send data on the uplink carrier. The UE may determine the subframe in which to send data on the uplink carrier based on a subframe in which the uplink grant is received. In another design, the UE may be semi-persistently scheduled for transmission of data on the uplink carrier, e.g., in evenly spaced subframes. The subframe in which to send data may be one of the subframes in which the UE is semi-persistently scheduled. The UE may also determine the subframe in other manners.

In general, the control information for the plurality of downlink carriers may comprise any type of information. In one design, the control information for each downlink carrier may comprise CQI, PMI, RI, ACK/NACK, some other control information, or a combination thereof.

In one design of blocks 916 and 918, the UE may determine a plurality of feedback reports to send in the subframe for the plurality of downlink carriers based on (i) a periodic feedback reporting (e.g., periodic CQI reporting) configuration for the plurality of downlink carriers or (ii) a feedback request (e.g., a CQI request) for the plurality of downlink carriers. The UE may determine the control information for the plurality of downlink carriers based on the plurality of feedback reports. In another design, the UE may determine (i) at least one periodic feedback report to send for at least one downlink carrier based on the periodic feedback reporting configuration and (ii) one or more aperiodic feedback reports to send for one or more downlink carriers based on a feedback request. The UE may determine the control information for the plurality of downlink carriers based on all feedback reports to send in the subframe. In one design, the UE may identify a downlink carrier for which to send (i) a periodic feedback report based on the periodic feedback reporting configuration and (ii) an aperiodic feedback report based on the feedback request. The UE may determine the control information for the downlink carrier based on the aperiodic feedback report and not the periodic feedback report. For example, the periodic feedback report may comprise either CQI/PMI or RI, and the aperiodic feedback report may comprise CQI/PMI and RI. In another design, the UE may identify a first downlink carrier for which to send a periodic feedback report, determine a second downlink carrier for which to send an aperiodic feedback report, and determine control information based on the aperiodic feedback report and not the periodic feedback report. The UE may also determine the control information for the plurality of downlink carriers in other manners.

In one design, the UE may select a primary uplink carrier, or an uplink carrier with a highest priority, or an uplink carrier having a highest data rate, or an uplink carrier associated with a designated downlink carrier as the uplink carrier on which to send the control information for the plurality of downlink carriers. In another design, the UE may determine the uplink carrier on which to send the control information for the plurality of downlink carriers based on an association between downlink carriers and uplink carriers configured for the UE. The UE may receive upper layer signaling indicating the association between the downlink carriers and the uplink carriers.

In one design, the UE may separately encode control information for each of the plurality of downlink carriers. In another design, the UE may jointly encode control information across downlink carriers. In this design, the UE may multiplex the control information for the plurality of downlink carriers based on at least one type of control information to obtain multiplexed control information of each type for the plurality of downlink carriers. The UE may multiplex control information of a particular type for the plurality of downlink carriers based on a predetermined order of the plurality of downlink carriers. The UE may set control information of the particular type for each of the plurality of downlink carriers to a predetermined size based on zero padding or coding, e.g., as shown in FIG. 6B. The UE may then jointly encode the multiplexed control information of each type for the plurality of downlink carriers. In yet another design, the UE perform both joint coding and independent coding. For example, the UE may jointly encode control information of a first type (e.g., RI or ACK/NACK) for all of the plurality of downlink carriers. The UE may separately encode control information of a second type (e.g., CQI/PMI) for each of the plurality of downlink carriers.

In one design of joint coding, the UE may multiplex the control information for the plurality of downlink carriers based on control information type to obtain multiplexed control information of each type for the plurality of downlink carriers. The UE may encode the multiplexed control information of each type for the plurality of downlink carriers to obtain coded information for each type. The UE may map the coded information for each type to modulation symbols. The UE may multiplex modulation symbols for the at least one type of control information with modulation symbols for data.

In one design of independent coding, the UE may encode control information for each of the plurality of downlink carriers to obtain coded information for each downlink carrier. The UE may map the coded information for each downlink carrier to modulation symbols. The UE may multiplex modulation symbols for the plurality of downlink carriers with modulation symbols for data.

In one design, the control information may comprise ACK/NACK for at least one data transmission sent on at least one downlink carrier. The UE may perform spatial bundling and may bundle ACK/NACK across codewords/packets per downlink carrier. Alternatively or additionally, the UE may perform carrier bundling and may bundle ACK/NACK across downlink carriers per codeword. In one design, the UE may receive an uplink grant comprising a DAI field and may determine the number of bits of ACK/NACK to send based on a value of the DAI field. In another design, the UE may determine a group of downlink carriers mapped to the uplink carrier for semi-persistent scheduling. The UE may determine the number of bits of ACK/NACK to send based on the number of downlink carriers in the group of downlink carriers. In one design, the UE send ACK/NACK for all downlink carriers on a designated uplink carrier.

In one design, the UE may map the control information for the plurality of downlink carriers to a single layer of the data channel. For example, the UE may map the control information for the plurality of downlink carriers to a plurality of locations of the data channel, with the control information for each downlink carrier being mapped to a different location of the data channel, e.g., as shown in FIG. 7B.

In another design, the UE may map the control information for the plurality of downlink carriers to a plurality of layers of the data channel. In one design, the UE may map the control information for each downlink carrier to a different layer of the data channel. In another design, the UE may map control information for each downlink carrier to a plurality of layers of the data channel, with each layer carrying a portion of the control information for each downlink carrier, e.g., as shown in FIG. 8B. In yet another design, the UE may map different types of control information to different numbers of layers. For example, the UE may map (i) control information of a first type (e.g., CQI/PMI) to a first number of layers and (ii) control information of a second type (e.g., RI or ACK/NACK) to a second number of layers. The UE may also map the control information for the plurality of downlink carriers to the plurality of layers of the data channel in other manners.

In one design, the UE may determine second control information for at least one additional downlink carrier. The second control information may comprise CQI, PMI, RI, ACK/NACK, other information, or a combination thereof, for each additional downlink carrier. The UE may send the second control information for the at least one additional downlink carrier (e.g., on a data channel or a control channel) on a second uplink carrier.

In one design, the UE may generate a plurality of SC-FDMA symbols based on the multiplexed control information and data. The UE may transmit the plurality of SC-FDMA symbols in a plurality of symbol periods of the subframe.

FIG. 10 shows a design of a process 1000 for receiving control information for multiple downlink carriers and data. Process 1000 may be performed by a base station/eNB (as described below) or by some other entity. The base station may determine that a UE is configured for multi-carrier operation on a set of downlink carriers (block 1012). The base station may schedule the UE for data transmission on a data channel of an uplink carrier in a subframe, e.g., via an uplink grant or semi-persistent scheduling (block 1014). The base station may determine control information for a plurality of downlink carriers to be received from the UE in the subframe (block 1016). The base station may receive at least a portion of the control information for the plurality of downlink carriers multiplexed with data on the data channel (e.g., the PUSCH) sent on the uplink carrier in the subframe by the UE (block 1018). The base station may demultiplex the control information for the plurality of downlink carriers and the data from the data channel (block 1020).

In one design, the base station may process the control information for the plurality of downlink carriers to obtain a plurality of feedback reports for the plurality of downlink carriers. Each feedback report may comprise control information for a different downlink carrier. The feedback report for each downlink carrier may be triggered based on a periodic feedback reporting configuration for the downlink carrier or a feedback request for the downlink carrier.

In one design, the base station may separately decode control information for each of the plurality of downlink carriers. In another design, the base station may jointly decode the control information for the plurality of downlink carriers for each of at least one type of control information. In yet another design, the base station may separately decode control information of a first type (e.g., CQI/PMI) and may jointly decode control information of a second type (e.g., RI or ACK/NACK).

In one design, the base station may obtain the control information for the plurality of carriers from a single layer of the data channel. In another design, the base station may obtain the control information for the plurality of downlink carriers from a plurality of layers of the data channel. In one design that may be applicable for separate coding, the base station may obtain the control information for the plurality of downlink carriers from a plurality of locations of the data channel, with the control information for each downlink carrier being obtained from a different location of the data channel.

Figure 11:
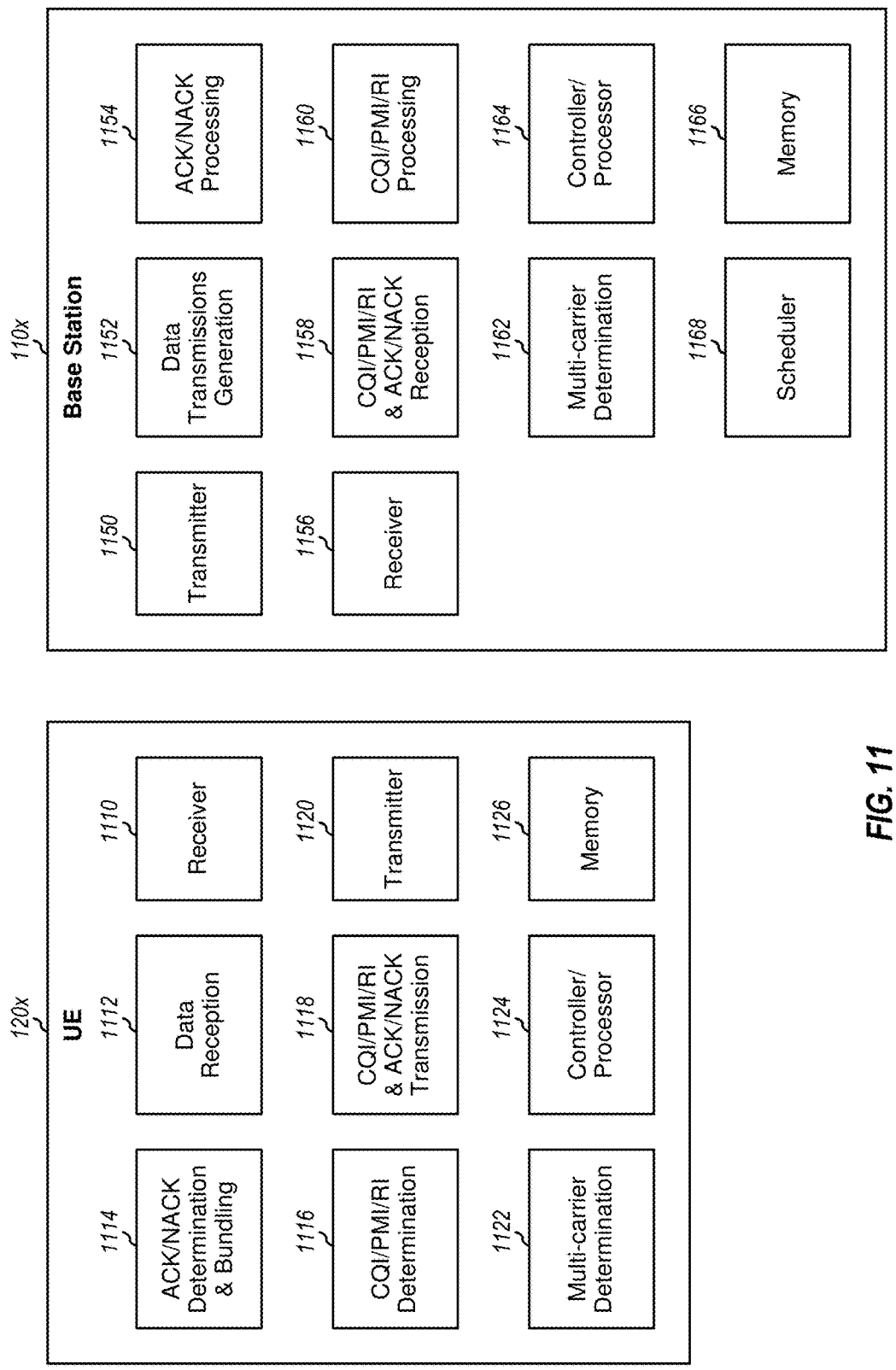
FIG. 11 shows a block diagram of a base station and a UE.

FIG. 11 shows a block diagram of a design of a base station/eNBs 110x and a UE 120x, which may be one of the base stations/eNBs and one of the UEs in FIG. 1. Within UE 120x, a receiver 1110 may receive and process downlink signals comprising data transmissions sent by base stations. A module 1112 may process (e.g., demodulate and decode) the received data transmissions. A module 1114 may determine ACKs and/or NACKs for the received data transmissions. Module 1114 may also perform spatial bundling, carrier bundling, and/or subframe bundling of the ACKs and/or NACKs, if applicable. A module 1116 may determine CQI/PMI/RI for each downlink carrier for which a CQI report is due or requested. A module 1118 may multiplex and encode CQI/PMI/RI and ACK/NACK for all downlink carriers. Module 1118 may multiplex control information comprising CQI/PMI/RI and/or ACK/NACK with data and may process the multiplexed control information and data to generate a PUSCH transmission. A transmitter 1120 may transmit an uplink signal comprising the PUSCH transmission.

A module 1122 may determine a multi-carrier configuration for UE 120$x$. For example, module 1122 may determine downlink carriers and uplink carrier(s) configured for UE 120$x$, the mapping of downlink carriers to uplink carrier(s), etc. The various modules within UE 120$x$ may operate as described above. A controller/processor 1124 may direct the operation of various modules within UE 120$x$. A memory 1126 may store data and program codes for UE 120$x$.

Within base station 110$x$, a module 1152 may generate data transmissions for UE 120$x$ and/or other UEs. A transmitter 1150 may generate downlink signals comprising the data transmissions. A receiver 1156 may receive and process uplink signals transmitted by UE 120$x$ and other UEs. A module 1158 may process a received signal to recover the PUSCH and/or other transmissions sent by UE 120$x$. A module 1154 may process ACK/NACK sent in a PUSCH transmission, perform unbundling if necessary, and provide indications to terminate or continue transmission of each packet. A module 1160 may process CQI/PMI/RI sent in the PUSCH transmission, select MCSs for packets to be transmitted, etc. A module 1162 may determine a multi-carrier configuration for UE 120$x$ and may determine downlink carrier and uplink carrier(s) configured for UE 120$x$, the mapping between downlink carriers and uplink carrier(s), etc. The various modules within base station 110$x$ may operate as described above. A controller/processor 1164 may direct the operation of various modules within base station 110$x$. A memory 1166 may store data and program codes for base station 110$x$. A scheduler 1168 may schedule UEs for data transmissions.

The modules in FIG. 11 may comprise processors, electronic devices, hardware devices, electronic components, logical circuits, memories, software codes, firmware codes, etc., or any combination thereof.

Figure 12:
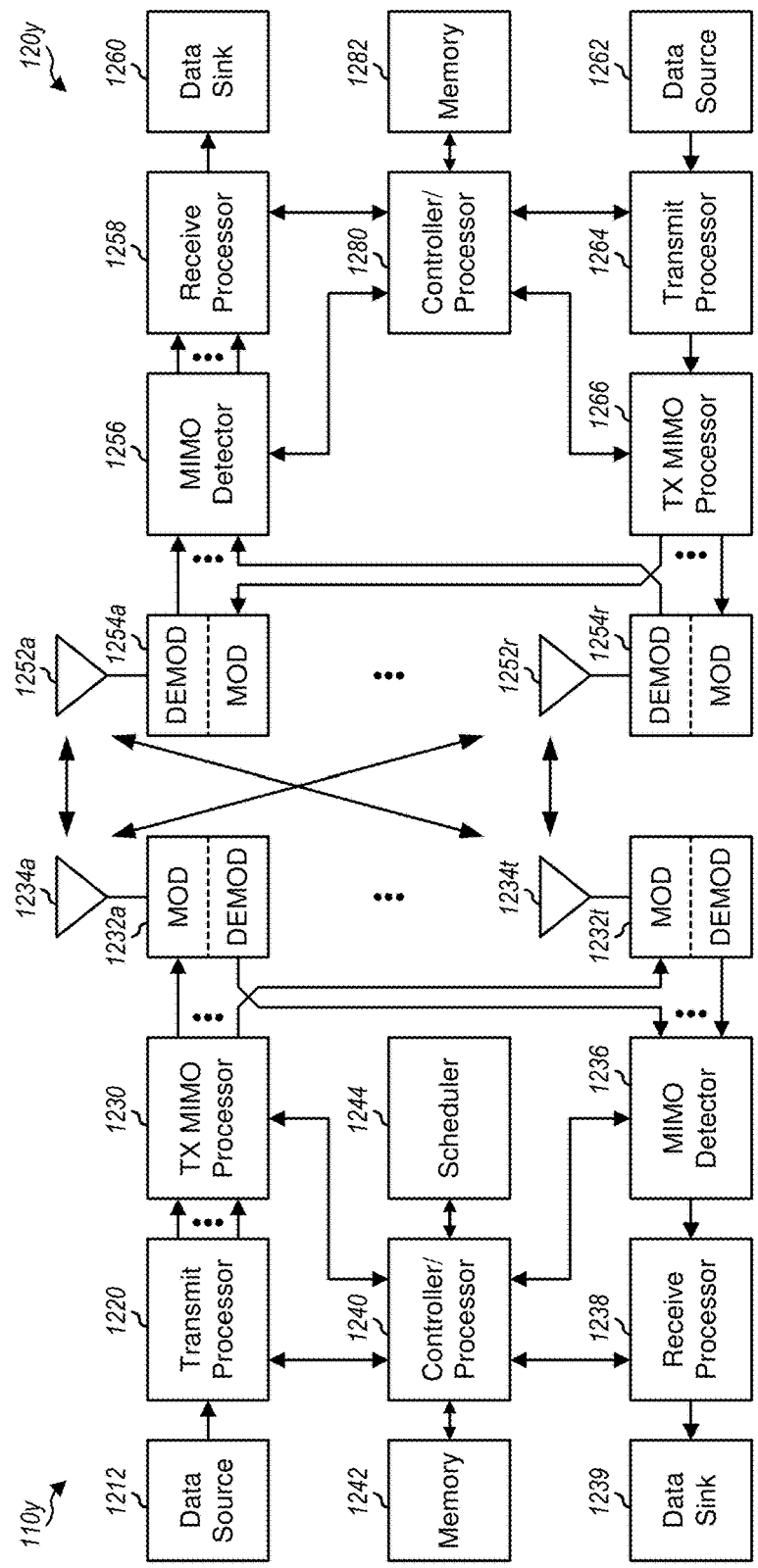
FIG. 12 shows another block diagram of a base station and a UE.

FIG. 12 shows a block diagram of a design of a base station/eNB 110$y$ and a UE 120$y$, which may be one of the base stations/eNBs and one of the UEs in FIG. 1. Base station 110$y$ may be equipped with T antennas 1234$a$ through 1234$t$, and UE 120$y$ may be equipped with R antennas 1252$a$ through 1252$r$, where in general T≥1 and R≥1.

At base station 110$y$, a transmit processor 1220 may receive data from a data source 1212 for one or more UEs, process (e.g., encode and modulate) the data for each UE based on one or more MCSs selected for that UE, and provide data symbols for all UEs. Transmit processor 1220 may also process control information (e.g., for downlink grants, uplink grants, configuration messages, etc.) and provide control symbols. Processor 1220 may also generate reference symbols for reference signals. A transmit (TX) multiple-input multiple-output (MIMO) processor 1230 may precode the data symbols, the control symbols, and/or the reference symbols (if applicable) and may provide T output symbol streams to T modulators (MOD) 1232$a$ through 1232$t$. Each modulator 1232 may process its output symbol stream (e.g., for OFDM, etc.) to obtain an output sample stream. Each modulator 1232 may further condition (e.g., convert to analog, amplify, filter, and upconvert) its output sample stream to obtain a downlink signal. T downlink signals from modulators 1232$a$ through 1232$t$ may be transmitted via T antennas 1234$a$ through 1234$t$, respectively.

At UE 120$y$, antennas 1252$a$ through 1252$r$ may receive the downlink signals from base station 110$y$ and/or other base stations and may provide received signals to demodulators (DEMODs) 1254$a$ through 1254$r$, respectively. Each demodulator 1254 may condition (e.g., filter, amplify, downconvert, and digitize) its received signal to obtain input samples. Each demodulator 1254 may further process the input samples (e.g., for OFDM, etc.) to obtain received symbols. A MIMO detector 1256 may obtain received symbols from all R demodulators 1254$a$ through 1254$r$, perform MIMO detection on the received symbols if applicable, and provide detected symbols. A receive processor 1258 may process (e.g., demodulate and decode) the detected symbols, provide decoded data for UE 120$y$ to a data sink 1260, and provide decoded control information to a controller/processor 1280.

On the uplink, at UE 120$y$, a transmit processor 1264 may receive and process data from a data source 1262 and control information (e.g., CQI, PMI, RI, ACK/NACK, etc.) from controller/processor 1280. Processor 1264 may also generate reference symbols for one or more reference signals. The symbols from transmit processor 1264 may be precoded by a TX MIMO processor 1266 if applicable, further processed by modulators 1254$a$ through 1254$r$ (e.g., for SC-FDM, OFDM, etc.), and transmitted to base station 110$y$. At base station 110$y$, the uplink signals from UE 120$y$ and other UEs may be received by antennas 1234, processed by demodulators 1232, detected by a MIMO detector 1236 if applicable, and further processed by a receive processor 1238 to obtain decoded data and control information sent by UE 120$y$ and other UEs. Processor 1238 may provide the decoded data to a data sink 1239 and the decoded control information to controller/processor 1240.

Controllers/processors 1240 and 1280 may direct the operation at base station 110$y$ and UE 120$y$, respectively. Processor 1280 and/or other processors and modules at UE 120$y$ may perform or direct process 900 in FIG. 9 and/or other processes for the techniques described herein. Processor 1240 and/or other processors and modules at base station 110$y$ may perform or direct process 1000 in FIG. 10 and/or other processes for the techniques described herein. Memories 1242 and 1282 may store data and program codes for base station 110$y$ and UE 120$y$, respectively. A scheduler 1244 may schedule UEs for data transmissions on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   identifying a data channel of an uplink carrier, the data channel having a plurality of spatial layers, wherein each of the plurality of spatial layers is associated with a different precoding for spatial multiplexing via a plurality of antenna ports of a transmitter;
   determining control information for one or more downlink carriers to send on the data channel, the control information comprising a first type of control information and a second type of control information, the second type of control information being different from the first type of control information;
   mapping the first type of the control information to a first number of spatial layers of the plurality of spatial layers;
   mapping the second type of the control information to a second number of spatial layers of the plurality of spatial layers, the second number of spatial layers being different from the first number of spatial layers; and
   sending, according to the precoding for spatial multiplexing via the plurality of antenna ports of the transmitter, the first type of the control information mapped to the first number of spatial layers and the second type of the control information mapped to the second number of spatial layers.

2. The method of claim 1, wherein mapping the first type of the control information to the first number of spatial layers comprises mapping the first type of the control information onto one spatial layer of the plurality of spatial layers.

3. The method of claim 1, wherein mapping the second type of the control information to the second number of spatial layers comprises mapping the second type of the control information onto each of the plurality of spatial layers.

4. The method of claim 1, wherein the first type of the control information comprises a channel quality indicator, a precoding matrix indicator, or a combination thereof, and wherein the second type of the control information comprises a rank indicator, an acknowledgement/negative acknowledgement, or a combination thereof.

5. The method of claim 1, further comprising:
   multiplexing the control information with a packet, wherein a different portion of the packet is sent on each of the plurality of spatial layers.

6. The method of claim 5, further comprising:
   splitting the control information among the plurality of spatial layers.

7. The method of claim 1, further comprising:
   multiplexing the control information with a plurality of packets, wherein one packet of the plurality of packets is sent on each of the plurality of spatial layers.

8. The method of claim 7, further comprising:
   splitting the control information among the plurality of packets.

9. The method of claim 1, further comprising:
   jointly encoding the control information to obtain jointly coded control information for the one or more downlink carriers prior to the mapping the control information onto the one or more of the plurality of spatial layers.

10. An apparatus for wireless communication, comprising:
- a processor; and
- memory coupled to the processor storing instructions that, when executed by the processor, cause the apparatus to:
  - identify a data channel of an uplink carrier, the data channel having a plurality of spatial layers, wherein each of the plurality of spatial layers is associated with a different precoding for spatial multiplexing via a plurality of antenna ports of a transmitter;
  - determine control information for one or more downlink carriers to send on the data channel, the control information comprising a first type of control information and a second type of control information, the second type of control information being different from the first type of control information;
  - map the first type of the control information to a first number of spatial layers of the plurality of spatial layers;
  - map the second type of the control information to a second number of spatial layers of the plurality of spatial layers, the second number of spatial layers being different from the first number of spatial layers; and
  - send, according to the precoding for spatial multiplexing via the plurality of antenna ports of the transmitter, the first type of the control information mapped to the first number of spatial layers and the second type of the control information mapped to the second number of spatial layers.

11. The apparatus of claim 10, wherein the instructions are executable to cause the apparatus to:
- map the first type of the control information onto one spatial layer of the plurality of spatial layers.

12. The apparatus of claim 10, wherein the instructions are executable to cause the apparatus to:
- map the second type of the control information onto each of the plurality of spatial layers.

13. The apparatus of claim 10, wherein the first type of the control information comprises a channel quality indicator, a precoding matrix indicator, or a combination thereof, and wherein the second type of the control information comprises a rank indicator, an acknowledgement/negative acknowledgement, or a combination thereof.

14. The apparatus of claim 10, wherein the instructions are executable to cause the apparatus to:
- multiplex the control information with a packet, wherein a different portion of the packet is sent on each of the plurality of spatial layers.

15. The apparatus of claim 14, wherein the instructions are executable to cause the apparatus to:
- split the control information among the plurality of spatial layers.

16. The apparatus of claim 10, wherein the instructions are executable to cause the apparatus to:
- multiplex the control information with a plurality of packets, wherein one packet of the plurality of packets is sent on each of the plurality of spatial layers.

17. The apparatus of claim 16, wherein the instructions are executable to cause the apparatus to:
- split the control information among the plurality of packets.

18. The apparatus of claim 10, wherein the instructions are executable to cause the apparatus to:
- jointly encoding the control information to obtain jointly coded control information for the one or more downlink carriers prior to the mapping the control information onto the one or more of the plurality of spatial layers.

19. An apparatus for wireless communication, comprising:
- means for identifying a data channel of an uplink carrier, the data channel having a plurality of spatial layers, wherein each of the plurality of spatial layers is associated with a different precoding for spatial multiplexing via a plurality of antenna ports of a transmitter;
- means for determining control information for one or more downlink carriers to send on the data channel;
- means for mapping a first type of the control information to a first number of spatial layers of the plurality of spatial layers;
- means for mapping a second type of the control information to a second number of spatial layers of the plurality of spatial layers, the second number of spatial layers being different from the first number of spatial layers; and
- means for sending, according to the precoding for spatial multiplexing via the plurality of antenna ports of the transmitter, the first type of the control information mapped to the first number of spatial layers and the second type of the control information mapped to the second number of spatial layers.

20. The apparatus of claim 19, wherein the means for mapping the first type of the control information to the first number of spatial layers maps the first type of the control information onto one layer of the plurality of spatial layers.

21. The apparatus of claim 19, wherein the means for mapping the second type of the control information to the second number of spatial layers maps the second type of the control information onto each of the plurality of spatial layers.

22. The apparatus of claim 19, wherein the first type of the control information comprises a channel quality indicator, a precoding matrix indicator, or a combination thereof, and wherein the second type of the control information comprises a rank indicator, an acknowledgement/negative acknowledgement, or a combination thereof.

23. The apparatus of claim 19, further comprising:
- means for multiplexing the control information with a packet, wherein a different portion of the packet is sent on each of the plurality of spatial layers.

24. The apparatus of claim 23, further comprising:
- means for splitting the control information among the plurality of spatial layers.

25. The apparatus of claim 19, further comprising:
- means for multiplexing the control information with a plurality of packets,
- wherein one packet of the plurality of packets is sent on each of the plurality of spatial layers.

26. The apparatus of claim 25, further comprising:
- means for splitting the control information among the plurality of packets.

27. A non-transitory computer-readable medium storing code for wireless communication, the code comprising instructions that are executable to:
- identify a data channel of an uplink carrier, the data channel having a plurality of spatial layers, wherein each of the plurality of spatial layers is associated with a different precoding for spatial multiplexing via a plurality of antenna ports of a transmitter;
- determine control information for one or more downlink carriers to send on the data channel, the control information comprising a first type of control information and a second type of control information, the second type of control information being different from the first type of control information;
- map the first type of the control information to a first number of spatial layers of the plurality of spatial layers;

map the second type of the control information to a second number of spatial layers of the plurality of spatial layers, the second number of spatial layers being different from the first number of spatial layers; and send, according to the precoding for spatial multiplexing via the plurality of antenna ports of the transmitter, the first type of the control information mapped to the first number of spatial layers and the second type of the control information mapped to the second number of spatial layers.

28. The apparatus of claim 19, further comprising:

means for jointly encoding the control information to obtain jointly coded control information for the one or more downlink carriers prior to the mapping the control information onto the one or more of the plurality of spatial layers.

29. The non-transitory computer-readable medium of claim 27, wherein the instructions that are executable to map the first type of the control information to the first number of spatial layers are executable to map the first type of the control information onto one spatial layer of the plurality of spatial layers.

30. The non-transitory computer-readable medium of claim 27, wherein instructions that are executable to map the second type of the control information to the second number of spatial layers are executable to map the second type of the control information onto each of the plurality of spatial layers.

* * * * *